United States Patent [19]

Przybylowicz et al.

[11] Patent Number: 5,671,070

[45] Date of Patent: Sep. 23, 1997

[54] TONAL CONSISTENCY IN A RADIOGRAPHIC IMAGE NETWORK

[75] Inventors: James Edward Przybylowicz; Timothy James Averion-Mahloch, both of Rochester, N.Y.; Mark Gregory Wofford, Dallas, Tex.

[73] Assignee: Eastman Kodak Company, Rochester, N.Y.

[21] Appl. No.: 420,452

[22] Filed: Apr. 10, 1995

Related U.S. Application Data

[63] Continuation of Ser. No. 981,143, Nov. 24, 1992, abandoned.

[51] Int. Cl.$^6$ .................. H04N 1/04; G06F 15/00
[52] U.S. Cl. .............. 358/487; 364/413.23; 382/132
[58] Field of Search .................. 358/401, 406, 358/444, 461, 464, 487; 364/413.13, 413.22, 413.23; 382/128, 132, 168; 250/370.09

[56] References Cited

U.S. PATENT DOCUMENTS

| | | | |
|---|---|---|---|
| Re. 31,847 | 3/1985 | Luckey | 250/327.2 |
| 5,046,118 | 9/1991 | Ajewole et al. | 358/461 |
| 5,151,592 | 9/1992 | Boutet et al. | 250/228 |
| 5,164,993 | 11/1992 | Capozzi et al. | 382/51 |
| 5,172,419 | 12/1992 | Manian | 382/6 |
| 5,261,050 | 11/1993 | Fox et al. | 395/166 |

*Primary Examiner*—Edward L. Coles, Sr.
*Assistant Examiner*—Thomas D. Lee
*Attorney, Agent, or Firm*—William F. Noval

[57] ABSTRACT

Method and apparatus for insuring tonal consistency between radiographic images visualized on softcopy display devices (video display) or hardcopy display devices radiography film laser printer). The method of transmitting an input digital radiographic image signal over a network to insure consistent tonal matching includes the steps of producing an input digital radiographic image by a source imaging device; providing a source-to-density look-up-table (SDL) which defines the distribution of the tonal response for the source imaging device; and transmitting the input digital radiographic image signal over a network to an output radiographic image visualization device along with the source-to-density LUT. Preferably, the output device is provided with a local density-to-display LUT (LDDL), the LDDL and SDL are cascaded together to form an output device display correction table, and the transmitted digital radiographic image signal is processed with the display correction table to produce a tonally corrected visual radiographic image.

8 Claims, 28 Drawing Sheets

QC Exams

Patient Name:
Patient ID:
Exam Date/Time:
Version:

| Patient Information |
| Exam Information |
| Image Orientation |
| Image Processing |

| Route Exam |
| Discard Exam |
| Exam List |
| Main Menu |

Exams Available for Initial QC 026-30-2277 Robins, Janet E.
045-68-0246 Hiss, Steven P.

Exams Available for Reprocessing 045-68-0246 Hiss, Steven P.
026-30-2277 Robins, Janet E.
110-52-8378 Stall, Gretchen L.

QC Exams

Patient Name: Robins, Janet E.
Patient ID: 026-30-2277
Exam Date/Time: 05-05-92
Version: ◇1 ◇2 ◇3 ◇4

Route Exam

1. Verify Exam Information:
   Tech ID: JER
   Requisition Number: xyz123
   Cassette ID: BB1023
   Projection: AP
   Body Part: Chest
   Position: Supine
   Distance: 45
   kVp: 70
   mAs: 2.5

2. Select Exam Destination(s):
   ICU1 PDS
   ICU2 PDS
   Radiology Kelp
   Archive Number of Prints: 1
Print Priority: Normal Route Exam    Modify Exam

Patient Information

| | |
|---|---|
| Patient Name | Robins, Janet E. |
| Patient ID | 123-45-6789 |
| Date of Birth | 08-10-1965 |
| Patient Sex | Female |
| Radiologist | Dr. Joanne Vane |
| Referring Physician | Dr. Lance Underwood |
| Room-Unit Number | 222 |
| Bed Number | 13 |

Destination(s):
ICU1 PDS
ICU2 PDS
Radiology KELP

[Update] [Reset] [Done]

QC Exams

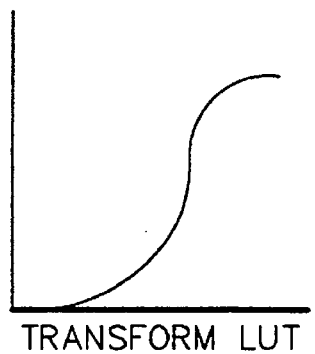
FIG. 21 TRANSFORM LUT
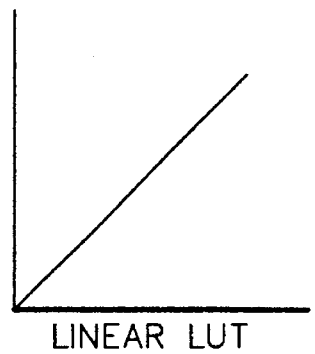
FIG. 22 LINEAR LUT
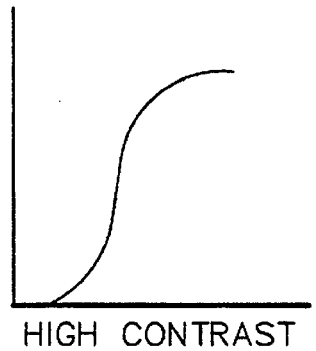
FIG. 23 HIGH CONTRAST LUT
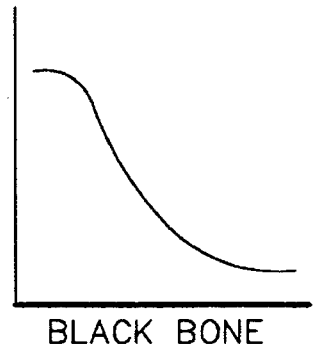
FIG. 24 BLACK BONE LUT
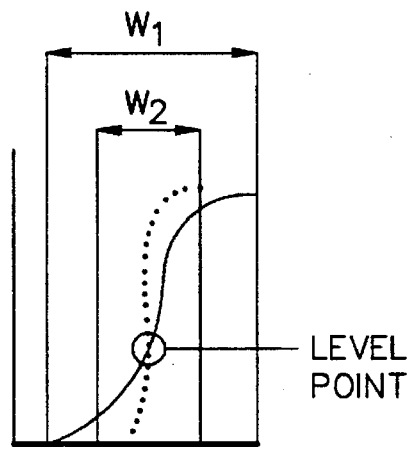
FIG. 25
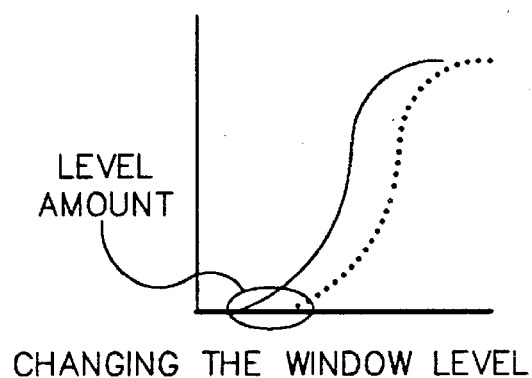
FIG. 26 CHANGING THE WINDOW LEVEL

FOR CHEST/ABDOMEN

|  | KERNEL SIZE | HIGH BOOST | LOW BOOST |
|---|---|---|---|
| HIGH | 75 | 1.5 | .5 |
| MEDIUM | 75 | 1 | .25 |
| LOW | 75 | .5 | .125 |

FOR EXTREMITIES

|  | KERNEL SIZE | HIGH BOOST | LOW BOOST |
|---|---|---|---|
| HIGH | 37 | 1.5 | 1.5 |
| MEDIUM | 37 | 1 | 1 |
| LOW | 37 | .5 | .5 |

FIG. 27

| EXAM TYPE | AVERAGE DENSITY | LUT START |
|---|---|---|
| SKULL | 1050 | 150 |
| CERVICAL SPINE | 1050 | 150 |
| LATERAL CHEST | 1000 | 0 |
| OTHER CHEST | 950 | 0 |
| THORACIC SPINE | 950 | 0 |
| CLAVICLE | 950 | 0 |
| BREAST | 950 | 0 |
| ABDOMEN | 1050 | 150 |
| LUMBAR | 1050 | 150 |
| PELVIS | 1050 | 150 |
| HIP | 1050 | 150 |
| EXTREMITY | 1350 | 150 |

FIG. 28

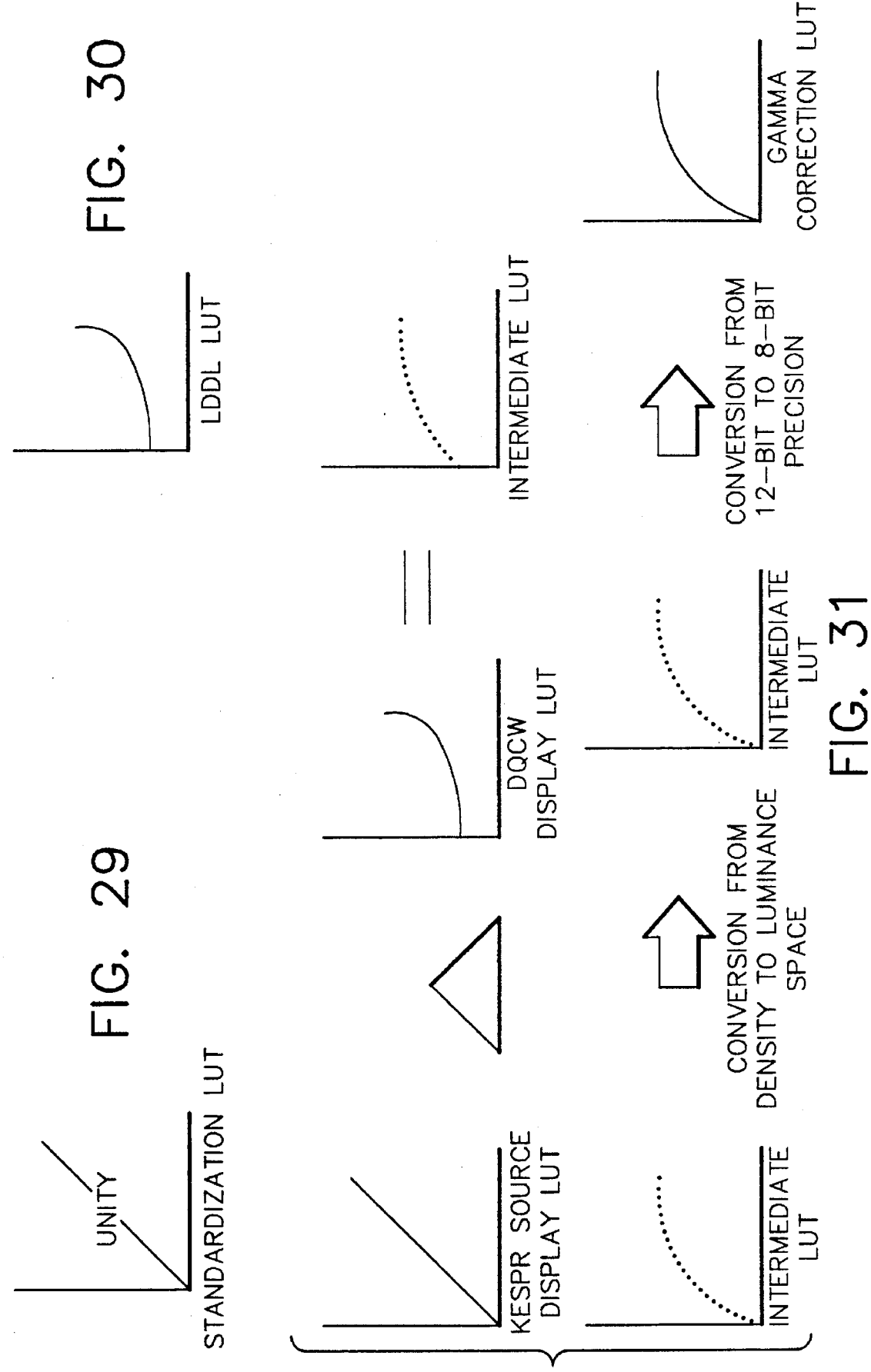

TONAL CONSISTENCY IN A RADIOGRAPHIC IMAGE NETWORK

This is a continuation of application U.S. Ser. No. 981,143, filed 24 Nov. 1992, abandoned.

FIELD OF THE INVENTION

This invention relates in general to radiographic image systems and more particularly to method and apparatus for insuring tonal consistency between radiographic images visualized on softcopy display devices (video display) or hardcopy display devices (radiographic film laser printer).

BACKGROUND OF THE INVENTION

Portable x-ray images are used to aid in assessing pathological changes and/or tube/line placement in critically ill patients in the U.S. Over 50% of portable examinations are performed in Critical Care Units (Intensive Care and Coronary Care). The remaining portable exams are performed on the medical or surgical floors or in the Emergency Room. Most patients in a Critical Care Unit have an x-ray procedure at least once per day. The primary portable exam type is AP (anterior-posterior) chest (80% of portable procedures) followed by abdomen and bone. The portable chest radiography market is expected to grow 20% in the United States over the next 5 years.

The technologist's problems in portable radiography are well known: maneuverability of the portable x-ray generator, carrying a large number of cassettes, x-ray tube positioning and determination of proper technique. The variability in positioning the x-ray tube results in different techniques between exams. This sometimes results in over or underexposure so that the radiologist requires an exam to be repeated. The average repeat rate is on the order of 5% to 10%.

The films that are generated while the patient is in a Critical Care Unit are kept in either the radiology department or in the unit. Typically, the most recent films are put on an alternator for easy access and review. Consultation about the procedure occurs where the films are located, requiring either the radiologist or the clinician to Go to the films. At some institutions, a double film protocol is used in order to give both the radiologist and clinician easier access to the image.

As radiologists read portable exams, the most current film is compared to previous films to assess changes in the patient's condition. The variability in exposure with current film/screen combinations adds to the difficulty in the assessment of changes that are due to illness.

The clinicians in the Critical Care area often need immediate access to the portable films in order to check proper tube placement. They often "borrow" the film from the radiology department before the radiologist has a chance to read it. Sometimes these films are not returned and a report is not generated; thus the hospital has lost revenue for that exam.

As the population grows older, more people will be hospitalized and require surgery and critical care. Thus the number of portable examinations will increase; the need for better quality and faster portables will increase and hospitals will be in a position to justify the allocation of funds for new systems and additional generators specifically for portable procedures.

In the decades after the end of World War II, there were significant advances in phosphor materials. These advances made high speed electronic imaging possible. Research at Eastman Kodak Company, Rochester, N.Y., led to the first demonstration of a scanned storage phosphor radiographic system. This system was originally patented in 1975 and reissued as U.S. Pat. No. Re. 31,847, reissued Mar. 12, 1985, to Luckey. In the storage phosphor system disclosed a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wavelength, such as blue light, in proportion to the quantity of x-rays that were received. To produce a signal useful in electronic image processing the storage phosphor is scanned in a raster pattern by a laser beam deflected by an oscillating or rotating scanning mirror or hologon. The emitted radiation from the storage phosphor is reflected by a mirror light collector and detected by a photodetector such as a photomultiplier to produce an electronic x-ray image signal. Typically the storage phosphor is translated in a page scan direction past the laser beam which is repeatedly deflected in a line scan direction perpendicular to the page scan motion of the storage phosphor to form a scanning raster pattern of a matrix of pixels.

The x-ray image signal can then be viewed as a visual image produced by a softcopy display device, such as a video display (CRT, LCD) or a hardcopy display device, such as a x-ray film printer (laser printer, CRT printer, thermal printer).

A problem exists in maintaining tonal consistency because the softcopy tonal response is different from the assumed linear output tonal response of a hard copy device in the following ways, nonlinear, smaller dynamic range, less resolution, inverted, viewing conditions.

SUMMARY OF THE INVENTION

According to the present invention, there is provided a solution to this problem in the prior art. According to the present invention, a method of transmitting an input digital radiographic image over a network to insure consistent tonal matching comprises the steps of:

producing an input digital radiographic image by a source imaging device;

providing a source-to-density look-up-table (LUT) which defines the distribution of the tonal response for the source imaging device; and transmitting the input digital radiographic image signal along with said source to density LUT over a network to an output radiographic image visualization means.

According to a further aspect of the present invention, a digital radiographic image system comprises:

a digital radiographic image input source means for producing a digital radiographic image signal having a source-to-density look-up-table (SDL) associated therewith;

an output radiographic image visualization means for producing a visual radiographic image of said digital radiographic image signal, said output visualization means having a local density-to-display look-up-table (LDDL); and network means for linking said digital radiographic image input source means and said output radiographic image visualization means;

wherein said source means transmits a produced digital radiographic image signal with said associated SDL over said network means to said visualization means; wherein said visualization means cascades said transmitted SDL with said LDDL to produce a local display correction table; and wherein said visualization means processes said transmitted digital radiographic image signal with said local display correction table to produce said visual radiographic image.

DESCRIPTION OF THE DRAWINGS

FIGS. 5–16 are screens depicting the functions of a quality control station of the system of FIG. 4.

FIGS. 21–24 are graphical views useful in illustrating tonescale image processing.

FIGS. 25–26 are diagrammatic views useful in illustrating window width and level image processing.

FIGS. 27 and 28 are views showing image processing default values.

FIGS. 29–39 are graphical views useful in illustrating the method and apparatus of the present invention.

DESCRIPTION OF THE PREFERRED EMBODIMENTS

Figure 1:
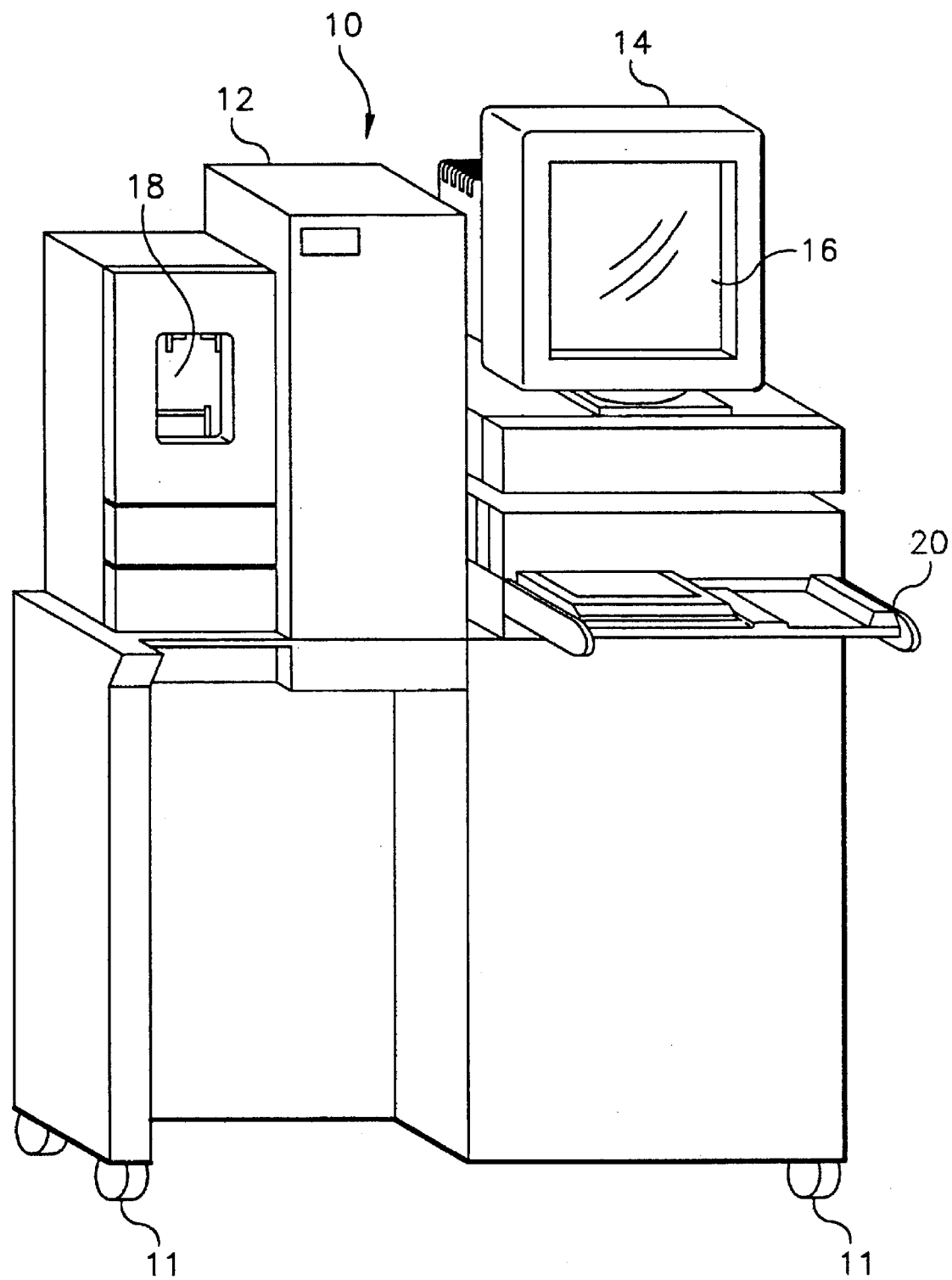
FIG. 1 is a perspective view of a storage phosphor reader.

Referring now to FIG. 1, there is shown a storage phosphor reader 10 incorporating an embodiment of the present invention. Reader 10 is mounted on casters 12 for easy portability in a radiology environment. Reader 10 includes a multiunit housing 12 housing the components of storage phosphor reader 10 and a video monitor 14 having a touch screen 16 supported on housing 12. Housing 12 also includes a bar code reader docking station 18 for docking a hand held bar code reader and for transferring data from the hand held bar code reader to storage phosphor reader 10. Reader 10 includes storage phosphor cassette load platform 20 which receives cassettes containing storage phosphor plates which are to be read or erased by reader 10.

In general, storage phosphor reader 10 processes images captured on a storage phosphor plate using conventional radiographic equipment. Reader 10 then scans the storage phosphor plate and converts the latent x-ray image therein into an electrical x-ray image signal which can be viewed on monitor 14. The scanned image is then delivered to a receiving device (such as a quality control station, laser printer or archival device) for image processing, image enhancement, viewing, printing and/or storage. The storage phosphor reader 10 is operated using touch screen 16 which also displays the image. The storage phosphor plates which are used to hold the unexposed x-ray images are mounted in standard size x-ray cassettes of different sizes. These storage phosphor plates can be erased and reused repeatedly. The optional hand held bar code reader can be used to collect exam information which is transferred to the storage phosphor reader 10 when it is mounted in station 18. The exam information is then associated with the scanned images.

In general, the storage phosphor reader is usable in the storage phosphor patient identification system disclosed in commonly assigned U.S. patent application Ser. No. 963,036, filed Oct. 19, 1992, inventor Good et al. As disclosed in that patent application, the storage phosphor patient identification system is as follows:

When a radiology technologist receives a request for an x-ray examination of a patient, the technologist exposes a body part of the patient to an x-ray which is stored as a latent x-ray image in the storage phosphor plate of a storage phosphor cassette. Several images may be taken at this time. Using the optional portable bar code reader the technologist scans the patient identification bar code label and the label on the storage phosphor cassette. Exam related information can be scanned from a bar code chart that is usually attached to the portable x-ray generator. Such information includes body part type, x-ray exposure conditions, position of patient and the like.

The image is now captured by the technologist performing the x-ray exam using the cassette containing the storage phosphor plate from which the bar code label was scanned. When the x-ray exam is complete the technologist takes the storage phosphor cassette to storage phosphor reader 10 to be processed. If the optional bar code reader is used, the technologist transfers the patient identification and exam information by inserting the bar code reader into the bar code reader station 18 on the front of reader 10. The scanned information is then transferred to the control system of the storage phosphor reader 10. The technologist then loads the cassette containing the exposed storage phosphor plate into reader 10 by loading on load platform 20. Scanning is initiated when the technologist presses a start button on touch screen 16.

Inside storage phosphor reader 10 the storage phosphor plate is extracted from the cassette and scanned with a laser light. As the plate is scanned, the image appears on touch screen 16 as it is being scanned. After the scanning is complete the image is sent to a receiving device where it can be tonescaled, enhanced, viewed, printed and/or stored. After the storage phosphor plate has been completely scanned it is erased by exposure to light which removes any remnants of the image. The storage phosphor reader 10 then places the storage phosphor plate back into its cassette. The technologist can now remove the cassette from reader 10 to be reused for another exam.

Figure 2:
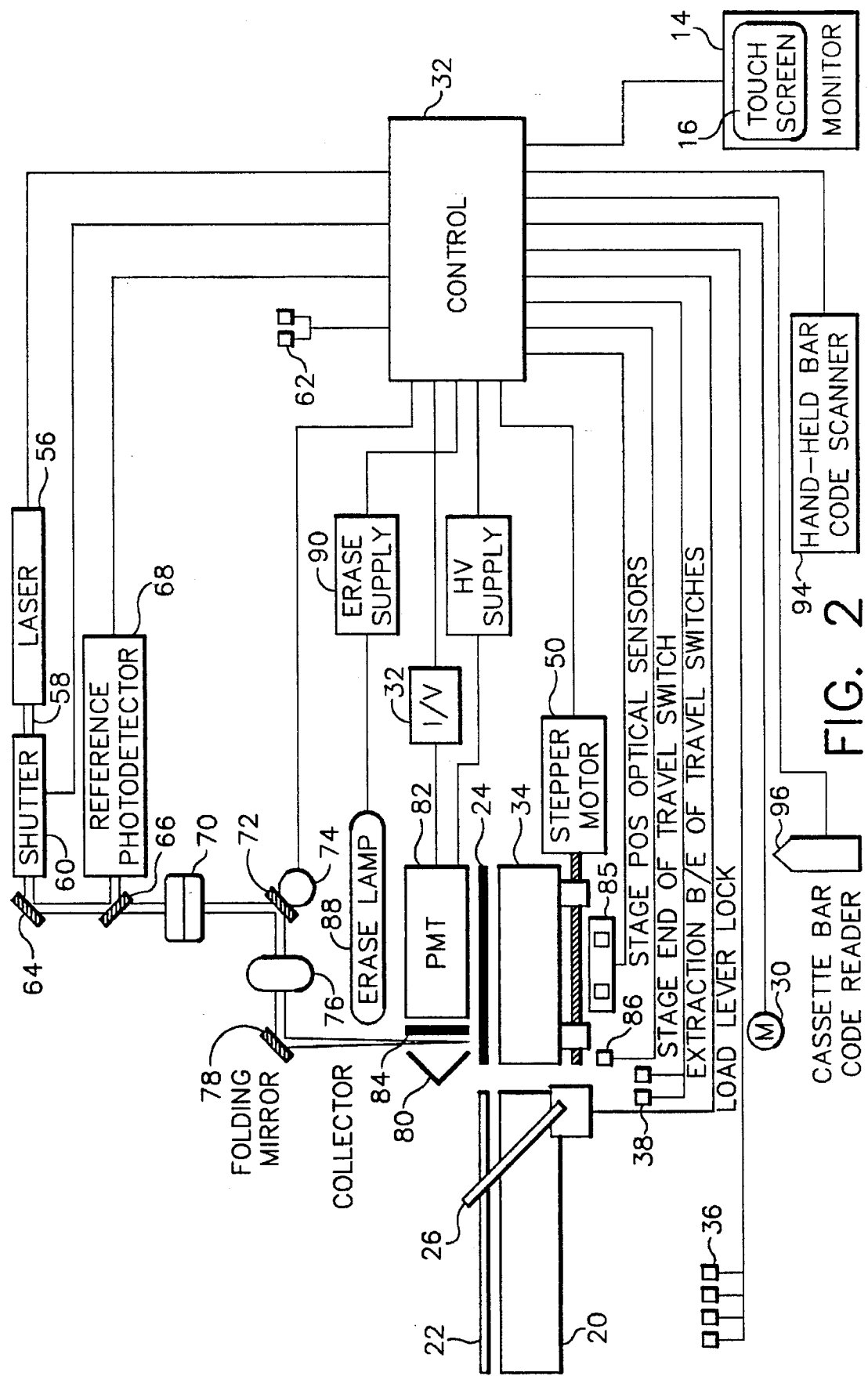
FIGS. 2 and 3 are respectively a partially diagrammatic, partially schematic view and a perspective view of the components of the storage phosphor reader of FIG. 1.
Figure 3:
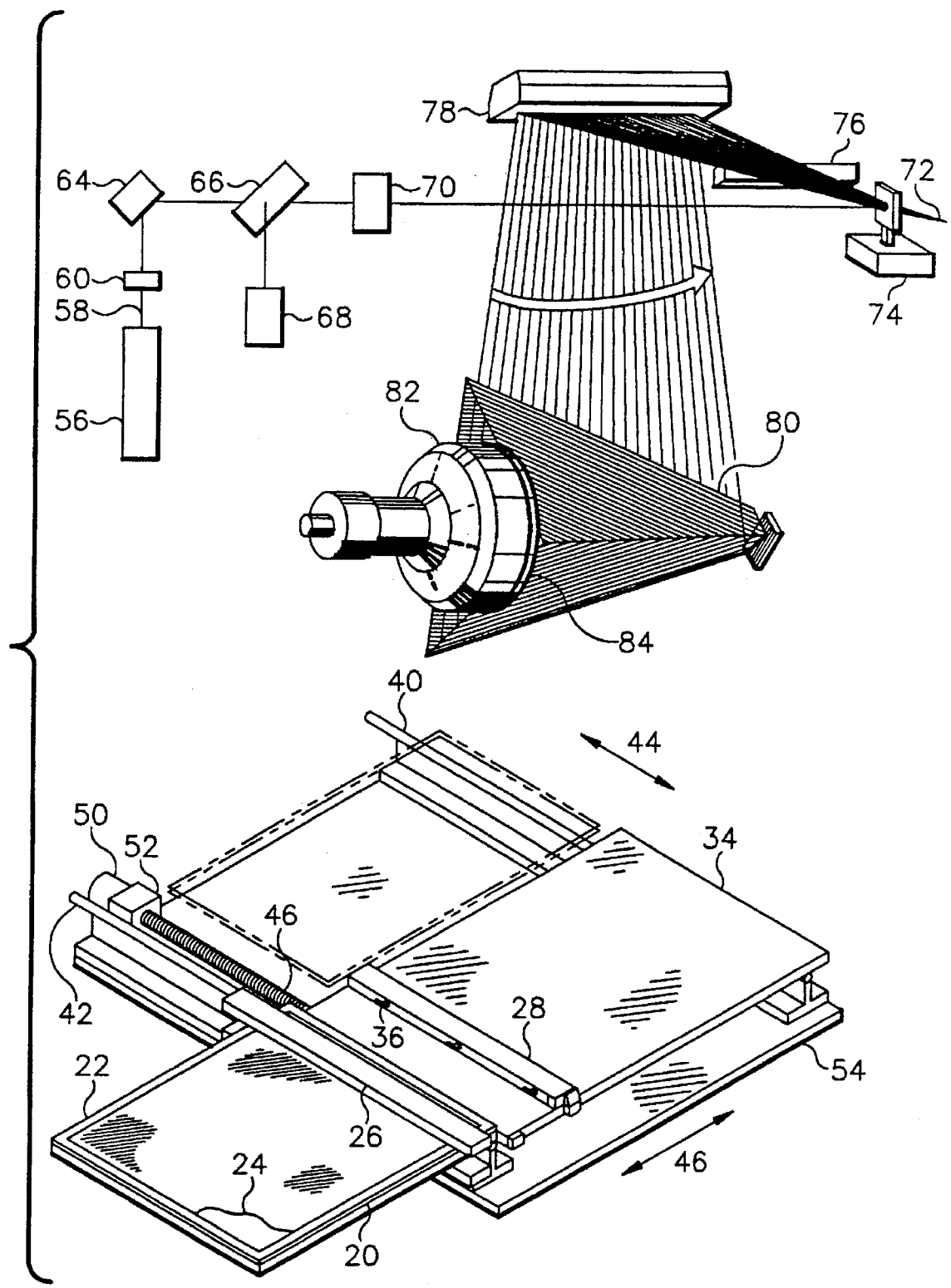

Referring now to FIGS. 2 and 3 there will be described in greater detail a preferred embodiment of storage phosphor reader 10. As shown, a storage phosphor cassette 22 containing a storage phosphor plate 24 is loaded on cassette load platform 20. Load lever 26 is rotated to clamp cassette 22 in place and to latch the cassette 22 to permit extraction of storage phosphor plate 24 therefrom. Storage phosphor plate 24 is extracted from cassette 22 by extraction device 28 (FIG. 3) which is actuated by extraction motor 30 under software control from control 32. Control 32 includes standard computer components such as a microprocessor, a magnetic disk drive for storing images, software applications and computer operating system and input and output devices to communicate with the components of reader 10. Such microcomputer systems are well known in the art and will not be described in detail herein.

Extraction device 28 is slidably mounted on translation stage 34 and includes hooks 36 which engage storage phosphor plate 24. Extraction device 28 extracts storage phosphor plate 24 from cassette 22 onto translation stage 34. As the storage phosphor plate 22 is loaded onto stage 34 it passes over plate size detecting switches 36 which detect the plate size and communicate this information to control 32.

There are sufficient plate size detectors 36 to detect the different plate sizes that can be processed by reader 10. The beginning and end of travel of extraction mechanism 28 are sensed by extraction begin and end travel switches 38 connected to control 32.

Translation stage 34 is slidably mounted on rails 40 and 42 for movement in opposite directions 44 which are perpendicular to the directions 46 of loading and unloading of plate 24 relative to translation stage 34. Translation stage 34 is driven by a screw drive mechanism 48 actuated by stepper motor 50 mounted on block 52. Rails 40 and 42 are supported by frame member 54 of reader 10.

The laser scanning components will now be described. Reader 10 includes a laser 56 (such as a helium neon gas laser) for stimulation of storage phosphor plate 24. Laser 56 produces a laser beam 58 which passes through a shutter 60. Shutter 60 is controlled by digital signals received from control 32. Shutter 60 closes with activation of cover interlock switches 62 which detect closure of the housing 12 covers.

Beam 58 is reflected off mirror 64 and passes through beam splitter 66 which directs a portion of the laser beam 58 to reference photodetector 68. Following the beam splitter 66 laser beam 58 passes through collimator 70. The collimated laser beam is deflected by an oscillating scan mirror 72 driven by galvanometer 74 under the control of control 32. Scan mirror 72 provides the line scan raster motion of the laser beam 58. Galvanometer 74 drives mirror 72 with a constant angular velocity.

An f-theta lens 76 produces a flat field of focus and constant linear velocity at the plane of storage phosphor plate 24. Folding mirror 78 directs the laser beam through light collector 80 onto storage phosphor plate 24. Collector 80 may be of the type disclosed in commonly assigned U.S. Pat. No. 5,151,592, issued Sep. 29, 1992, inventors Boutet et al. The stimulating light of laser beam 58 causes the storage phosphor in plate 24 to emit light (blue) which is a function of the x-ray image stored in plate 24. Collector 80 directs this emitted light onto photomultiplier tube (PMT) 82. A filter 84 in front of the face of PMT 82 blocks the scattered stimulating laser light and passes the light emitted by storage phosphor plate 24. Once a storage phosphor plate 24 is on translation stage 34 a scan is begun. Movement of translation stage 34 in the direction of arrow 44 is under software control of control 32. Control 32 sends commands to stepper motor 50 to initiate a scan, to start translation stage 34, to start galvanometer 74 and to turn on PMT 82. From the home position of stage 34 the control 32 counts stepper motor 50 steps to the point where the storage phosphor plate 24 is under collector 80. At this point acquisition of the latent x-ray image on storage phosphor plate 24 begins. At the end of the scan (determined by the number of scan lines for the appropriate storage phosphor plate size), PMT 82 and galvanometer 74 are turned off and translation stage 34 is returned to the home position which is determined by one of the stage position optical sensors 85. A stage end of travel switch 86 is located just beyond the position of optical sensors 84 to prevent damage in case of failure of optical sensors 84.

Immediately after translation stage 34 reaches the home position, erase lamp 88 is turned on by actuation of erase power supply 90 under software control from control 32. Following a predetermined erase time (such as 30 seconds) erase lamp 88 is turned off and extraction mechanism 28 returns storage phosphor plate 24 in the direction of arrow 46 to storage phosphor cassette 22. When the extraction mechanism 28 trips the extraction end of travel switch 38, the lock for load lever 26 is released. The storage phosphor reader user can now rotate load lever 26 and remove cassette 22 from loading platform 20.

During the scan of storage phosphor plate 24 an emitted x-ray light image is converted by PMT 82 into an x-ray electrical current signal. This signal is converted to a voltage by amplifier 92. As described in greater detail in commonly assigned U.S. patent application Ser. No. 965,657, filed Oct. 23, 1992, inventor S. Dhurjaty, entitled "Noise Reduction in a Storage Phosphor Data Acquisition System", laser noise which is present in the x-ray image signal produced by PMT 82 is corrected by subtracting a reference signal detected by reference photodetector 68. The corrected digital signal is corrected for the light collection signature of light collector 80 by a correction lookup table in control 32. The correction lookup table is loaded during calibration of reader 10 when it is initially set up.

Patient identification and examination information are downloaded into reader 10 from a hand held bar code scanner 94 positioned in station 18 of reader 10. As each storage phosphor plate 24 is extracted from its cassette 22 cassette bar code reader 96 reads the bar code on plate 24. The image data and corresponding patient and exam information are correlated by control 32.

The physical size of the cassettes 22 containing the storage phosphor plates 24 are identical to that of conventional radiographic film/screen cassette sizes. Typically storage phosphor reader 10 is capable of reading the following storage phosphor plate sizes: 18×24 centimeters, 24×30 centimeters, 35×35 centimeters, and 35×43 centimeters. The raster pattern or matrix pixel size for each storage phosphor plate that can be processed is, for example, as follows: 18×24 cm–1792×2400; 24×34 cm–2048×2500; 35×35 cm–2048×2048; and 35×43 cm–2048×2500.

Critical Care System

The storage phosphor reader 10 of FIG. 1 can be part of a critical care system made up of hardware and software that allows radiology technologists to (1) capture images onto a standard cassette which contains a storage phosphor plate using the sites conventional x-ray image capture methods; (2) convert those images into electronic images using the storage phosphor reader 10; (3) using a quality control workstation correct any erroneous patient information, exam information, and, if necessary, the x-ray image look; (4) print the image and its text label on an x-ray laser printer; and (5) enter patient information into the patient database and generate a bar code label for the patient identification. Optionally, the critical care system also allows a requesting physician or radiologist to view the image on a high resolution workstation, such as the Personal Display System supplied by Vortech, of Richardson, Tex. The system can also be expanded to allow optional permanent archiving of x-ray exams on optical disk where it can be retrieved for later viewing or reprinting.

Figure 4:
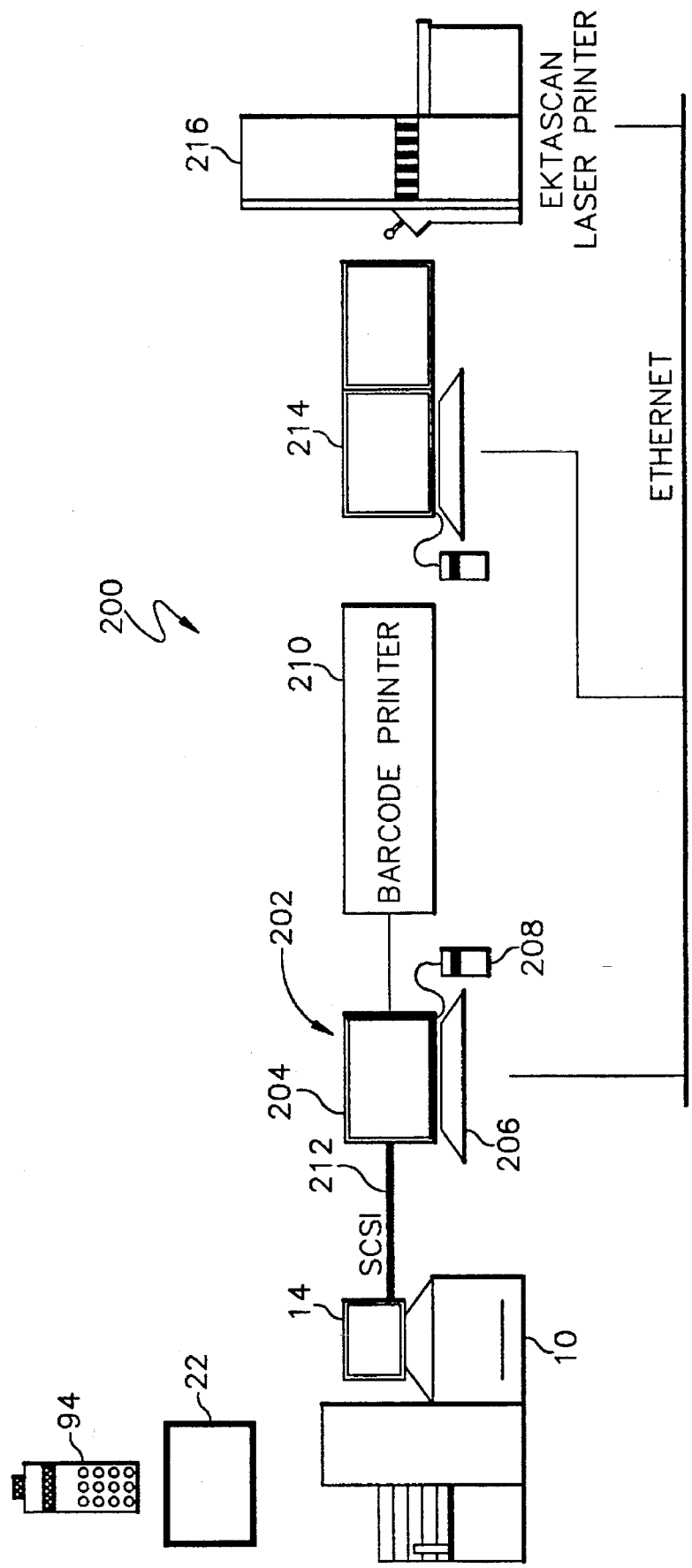
FIG. 4 is a schematic diagram of a critical care system incorporating the present invention.

Referring to FIG. 4, there is shown a diagrammatic view of a critical care system incorporating an embodiment of the present invention. As shown, critical care system 200 includes storage phosphor reader 10 having a control and viewing monitor 14. Reader 10 accepts storage phosphor x-ray cassette 22 for converting an x-ray image in the cassette storage phosphor into a digital x-ray image. A hand-held bar code scanner 94 is provided to download patient ID and exam information into reader 10. System 200 also includes quality control and data entry workstation 202 which includes a high resolution monitor 204, a data entry keyboard 206, and a mouse 208. An optional bar code printer 210 is linked to quality control workstation 202. Storage phosphor reader 10 communicates with work station 202 by means of a communication channel, such as a SCSI communications link 212.

Link 212 passes a raw digital x-ray image from storage phosphor reader 10 to quality control workstation 202. Workstation 202 allows a technologist to view the x-ray image. It also functions as the database server, upon which the demographic database resides. Workstation 202 will be described in greater detail hereinafter, but, in general, provides an interactive data entry interface for the technologist and prints patient ID bar code labels on bar code printer 210. Using the quality control workstation 202, the radiology technologist can modify the image presentation (orientation, tonescale, edge enhancement) and patient or examination information prior to approving the image and routing it to its next destination. The technologist can also modify or add routing information for a patient for a single image.

Quality control workstation 202 can be used in a pass-through mode or a manual mode. In pass-through mode, x-ray exams are processed at the workstation 202 and then routed directly to other destinations, such as high resolution PDS 214, or laser printer 216 (such as a Kodak Ektascan Laser Printer). In manual mode, a user must verify the x-ray image from reader 210 and patient and exam information before releasing it to its destination. The image enhancement which allows for proper display of the images for diagnostic purposes is performed by adaptive unsharp masking processing and tonescaling. The tonescaling algorithms are preferably those described in U.S. patent application Ser. No. 797,615, filed Nov. 25, 1991, inventors Capozzi and Schaetzing, entitled "Method and Apparatus for Automatic Tonescale Generation in Digital Radiographic Images" and U.S. patent application Ser. No. 906,191, filed Jun. 29, 1992, inventors Jang and Schaetzing, entitled "Method for Automatic Foreground and Background Detection in Digital Radiographic Images".

Quality control workstation 202 is linked to high resolution personal display system 214 and laser printer 216 by means of a communication link, such as an Ethernet link. This link may be a hard wire or optical linelink, or a wireless link, or a satellite link.

In general, quality control workstation 202 has sufficient resident memory and fixed disk storage to meet the following requirements: (1) storage of a predetermined number of x-ray exams, (2) patient database, (3) exam information (such as exposure conditions, body part, patient position, etc.), (4) preference information, i.e., image processing parameters for exam types, (5) error and transaction logs, (6) an operating system, (7) application software.

In general, the quality control workstation 202 provides the radiology technologist with the following functions (which will be described in greater detail below with respect to FIGS. 5–16).

1. Check images acquired from storage phosphor reader 10.

2. Correct patient information and x-ray exam information.

3. Adjust image parameters, such as image orientation and window width and level (after they have been automatically enhanced using tonescaling and unsharp masking techniques in workstation 202).

4. Route an acceptable exam or image (automatically or by specification) to one or more destinations such as an x-ray laser printer, a viewing station (PDS) or image archive. In manual mode, the exam must be approved (released) by the technologist before it will be automatically routed to a specified or default destination. Preferably, the image data is transmitted to its destination in a ACR-NEMA (America College of Radiology-National Electrical Manufacturers Association) file which contains the processed image data and ACR-NEMA header (containing patient information and exam information) and applicable look-up tables.

5. Automatically process exams and route them directly to the destinations. This is called pass-through mode.

6. Enter patient information (demographics) into the local (i.e., critical care system) patient database, or access the system patient database.

7. Generate bar code labels for each newly acquired patient identification number and, as necessary, new bar code labels required for the exam data collection card and, optionally, radiology technologist identification.

Figure 5:
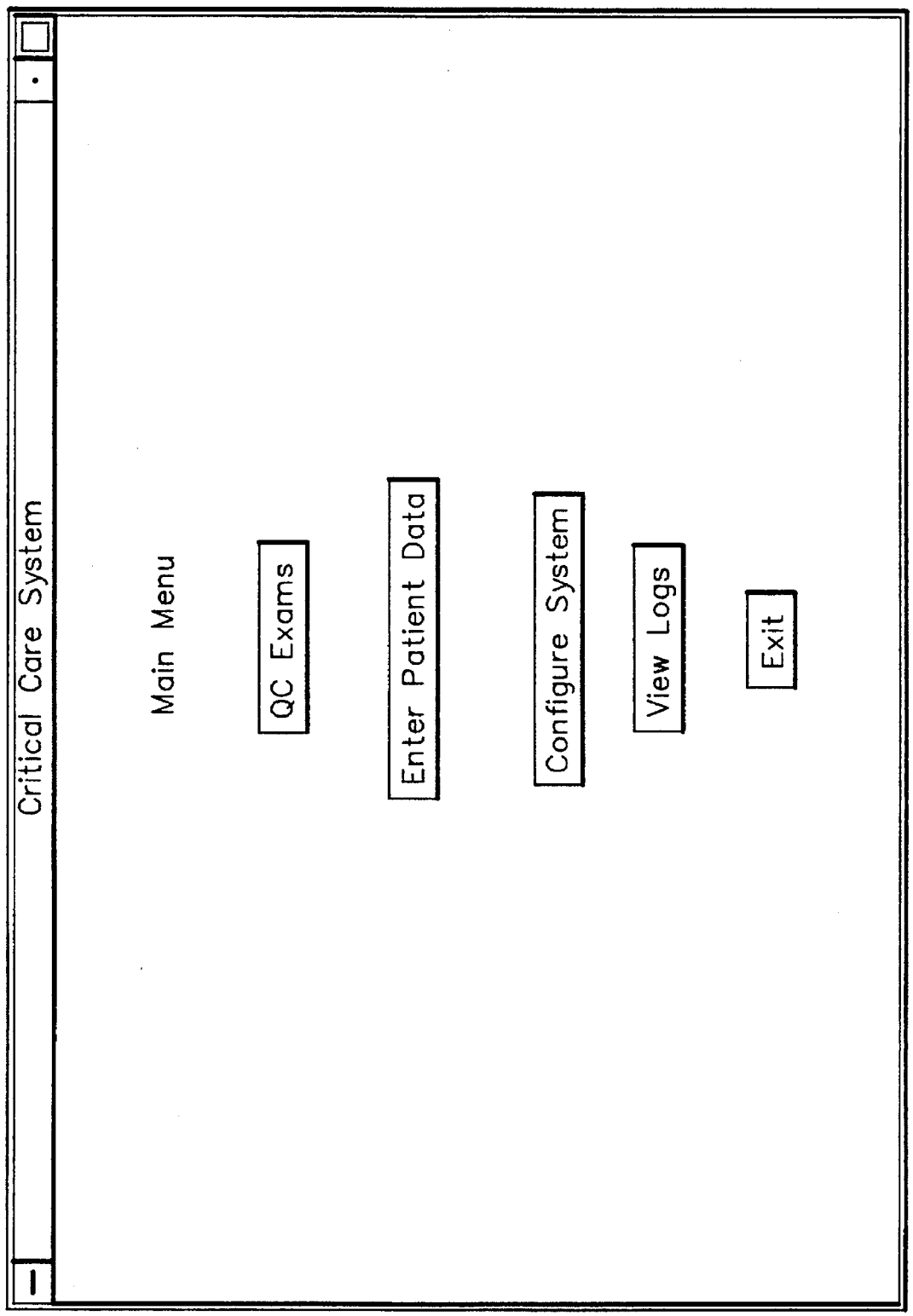

The enumerated functions of quality control workstation 202 will now be described in greater detail with reference to FIGS. 5–16 which depict the screens showing the menus and operations that can be effected by means of a pointer on the screen controlled by a mouse. As shown in FIG. 5, the main menu is used to select the quality control function to be used. Main menu shown in FIG. 5 includes the selectable functions QC exams, enter patient data, configure system, view logs, exit.

Figure 6:
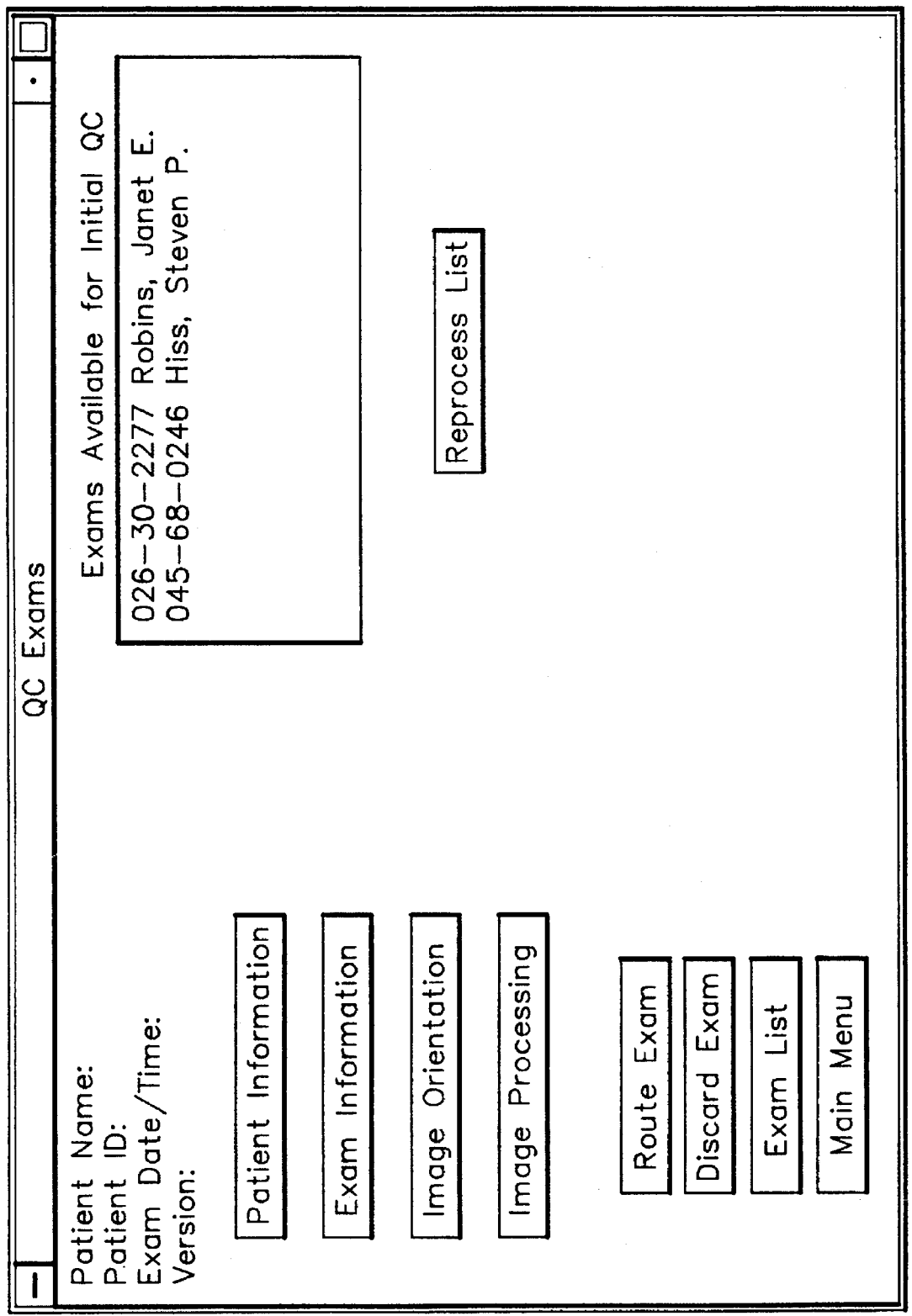

FIG. 6 depicts the QC exams screen with the exams (images) which are available for initial quality control processing. Two exams are listed for ROBBINS and HISS. This screen also indicates several other function buttons which can be selected, i.e., a reprocess list, patient information, exam information, image orientation, image processing, route exam, discard exam, exam list, and main menu. If the reprocess list button is chosen, the screen of FIG. 7 is shown. As shown, exams available for reprocessing include exams of HISS, ROBBINS, and STAHLMAN. The user can select the exam to be viewed from either list.

FIG. 8 shows the QC exam screen with ROUTE EXAM window which appears when the user elects to QC an exam or when the route exam button is selected. The x-ray image will appear in the window on the right hand side of the screen. In the upper left-hand corner of the screen, the patient name, patient ID, exam date/time, and version number are displayed. The route exam window shows exam information to be verified, such as, technologist identification, requisition number, cassette identification, x-ray exam projection, body part, position, distance, exposure kilovoltage (k VP), exposure milliamps (mAs), exposure index, and comment. In the lower left-hand region, the select exam destinations window indicates the four destinations that the exam display can be routed, i.e., ICU 1 PDS, ICU 2 PDS, radiology KELP (laser printer), archive. In the lower left-hand corner, the route exam and modify exam buttons may be selected.

Figure 9:
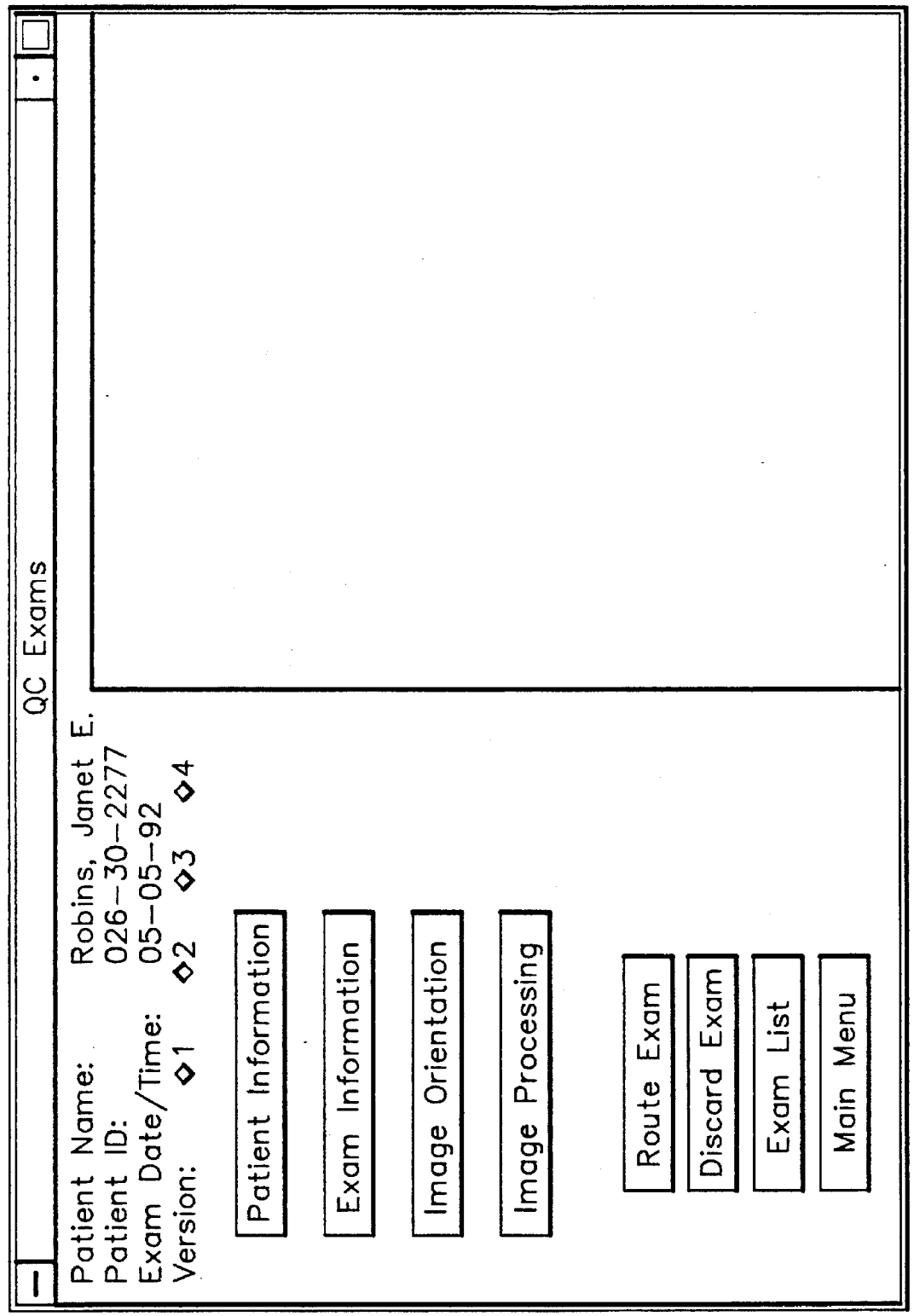
Figure 10:
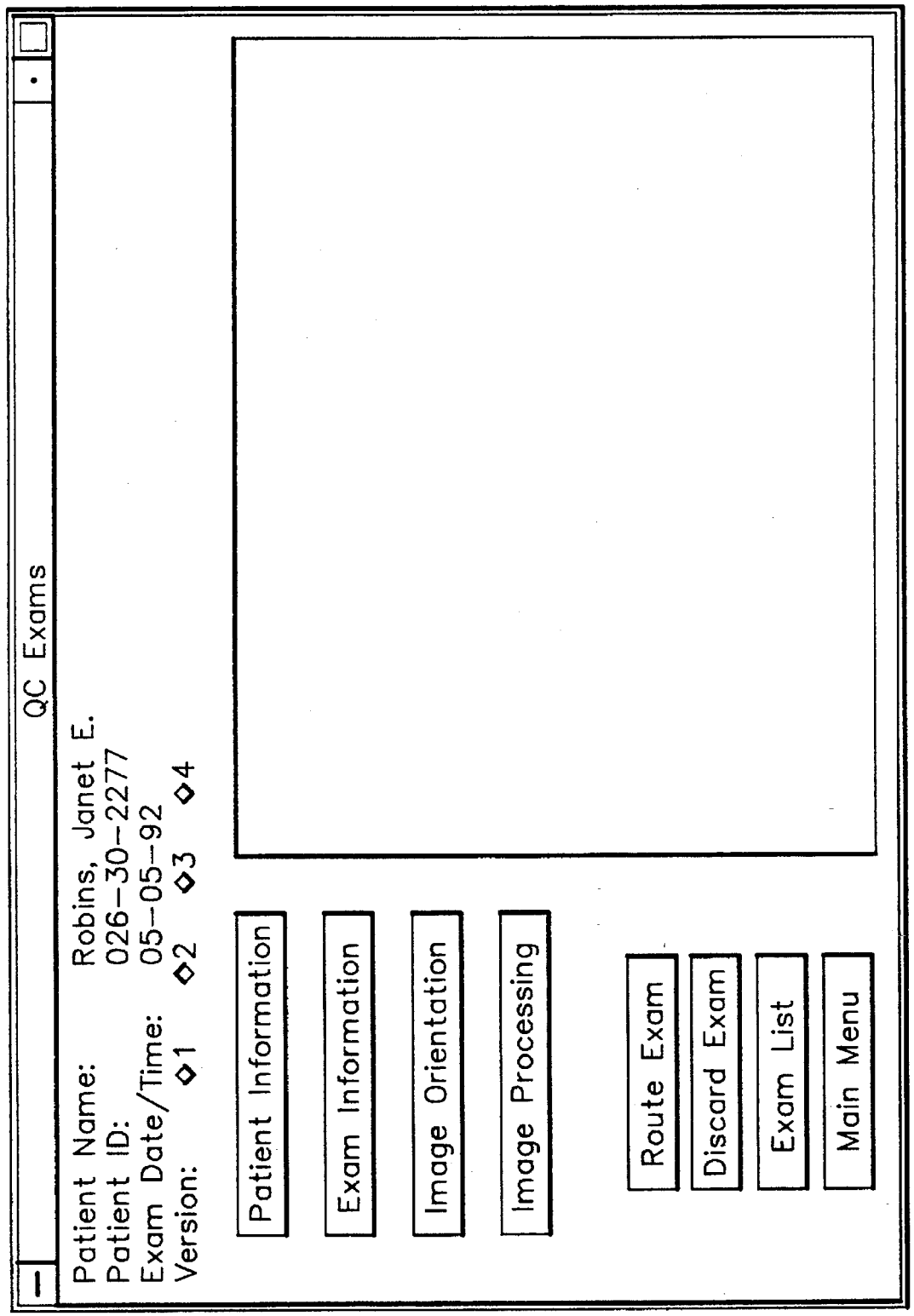

Referring to FIGS. 9 and 10, there are respectively shown the QC exam screen with portrait image display and landscape image display. The function buttons on the left-hand side allow the selection of any of the functions for the currently displayed image.

Referring to FIG. 11, the screen shown is the QC exam screen with patient information window. The patient information window is displayed when the patient information button, shown in FIG. 10, is selected. The patient information window shows the following patient information, i.e., patient name, patient ID, date of birth, patient sex, radiologist, referring physician, room/unit number, bed number, hospital, department, diagnosis, and destinations. The process buttons in the lower left-hand corner are update, reset and done. The operator of QC workstation can enter, verify or change the patient information with this screen displayed.

Figure 12:
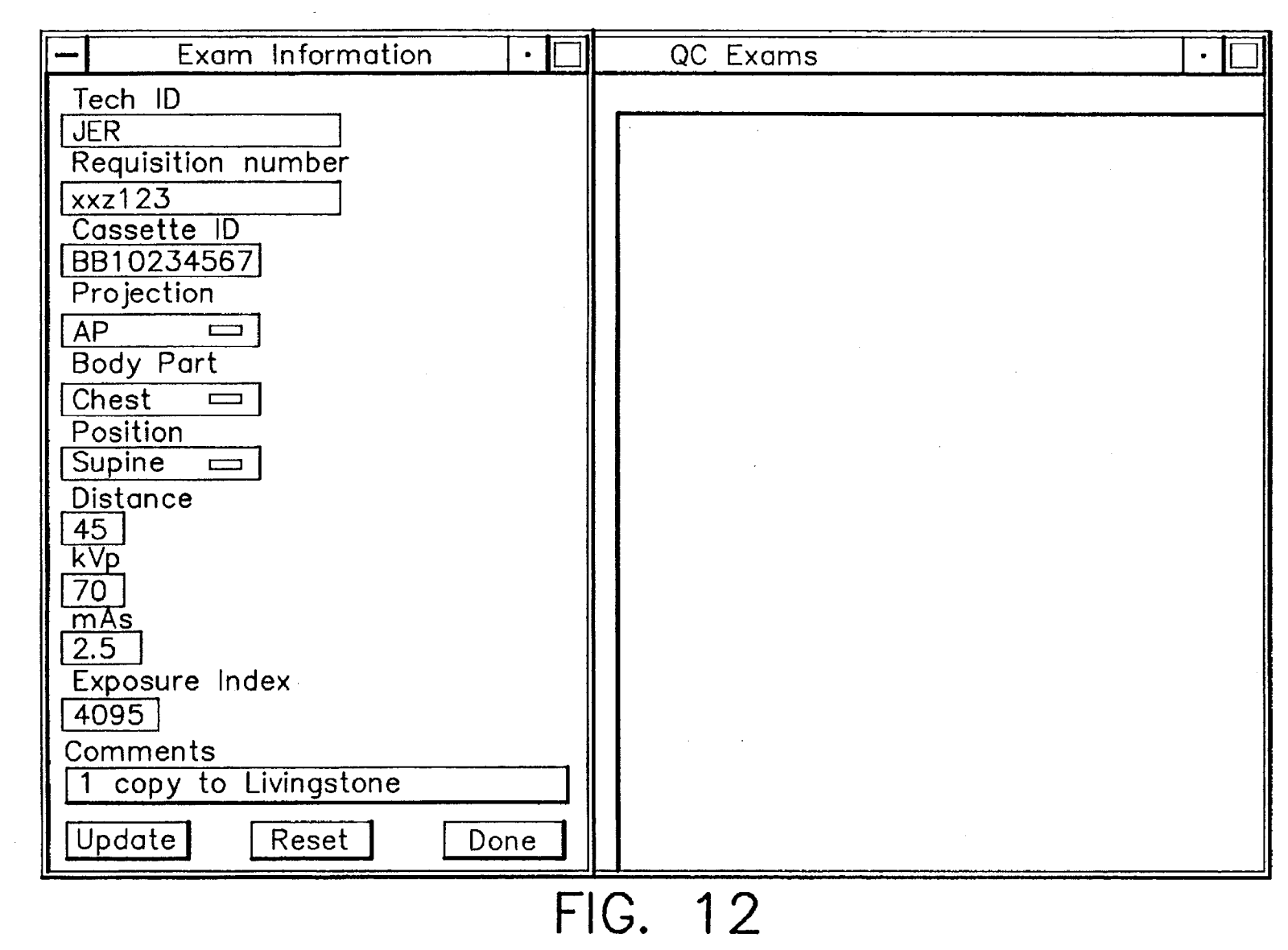

Referring to FIG. 12, the QC exam screen with exam information window is shown. The exam information window is displayed when the exam information button is selected. In the exam information window shown on the left-hand side of the screen, the following exam information are listed: technologist ID, requisition number, cassette ID, projection, body part, position, distance, KVP, MAS, exposure index, and comments. Any of these exam information items can be changed by the user. Again, the lower left-hand corner depicts the update, reset and done buttons for selection.

Figure 13:
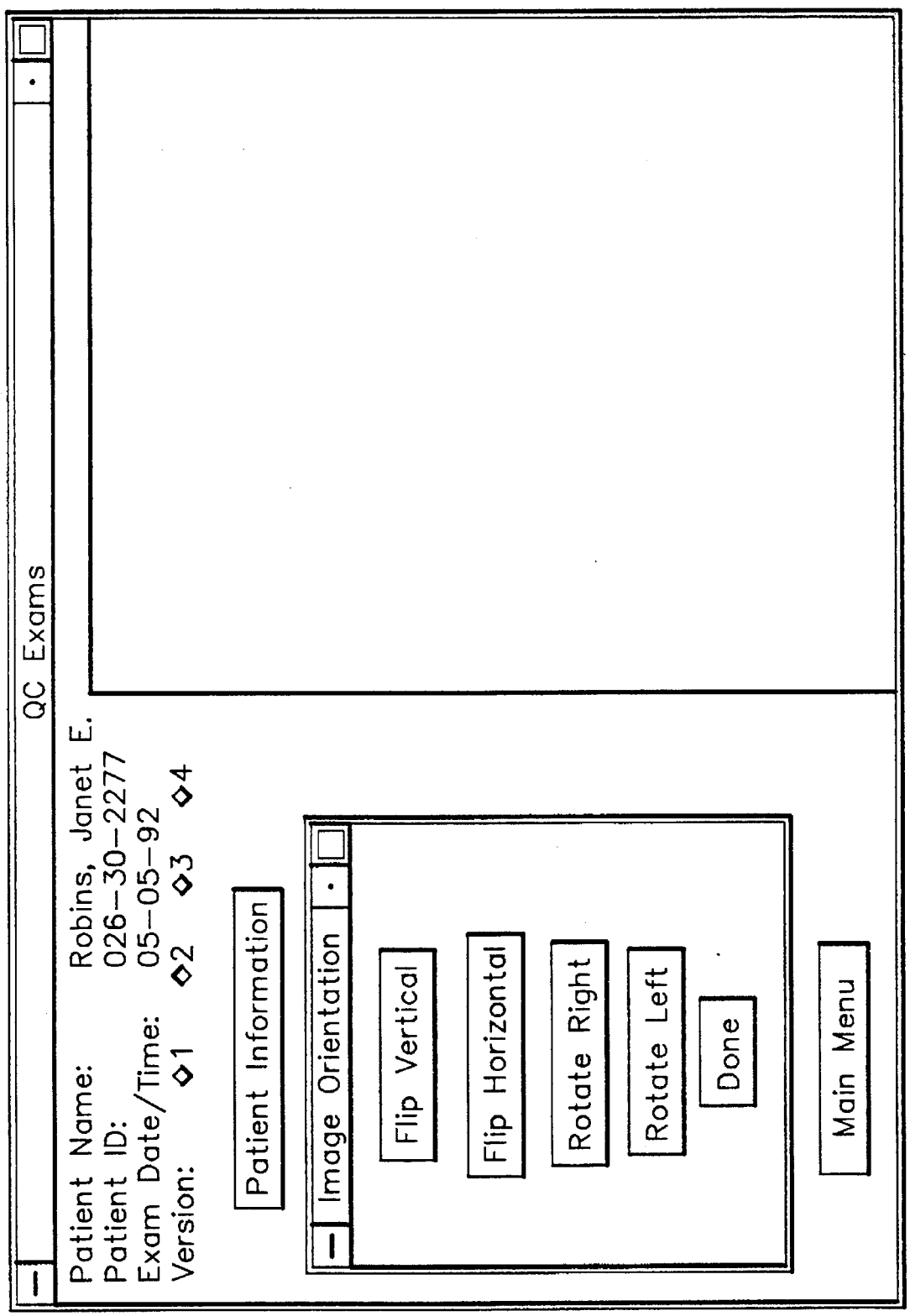

Referring to FIG. 13, the screen shows the QC exam screen with orientation window. This window is displayed when the image orientation button is selected. As shown in the image orientation window on the left-hand side, the buttons which are selectable are FLIP VERTICAL which effects flipping the image 180° about the horizontal axis; FLIP HORIZONTAL which effects flipping the image 180° about the vertical axis; ROTATE RIGHT which effects rotating the image 90° clockwise from the vertical axis; and ROTATE LEFT which effects rotation of the displayed image 90° counterclockwise from the vertical axis.

If necessary, the image and its versions are automatically orientated (rotated left) upon arrival at the quality control station 202 from storage phosphor reader 10. This orientation is based on the storage phosphor plate 24 orientation as read in storage phosphor reader 10 and described in greater detail above. When the image is displayed, the user can select to reorient it. All versions are also rotated automatically. In addition, depending on the print format of the laser printer 216, the images may have to be automatically rotated in order to be printed on film. For example, a "portrait" mode image can be sent to a printer as if it is to be printed "1-up" on a 14×17 film. If it is to be printed as "2-up", both images must be rotated before they are sent.

Figure 14:
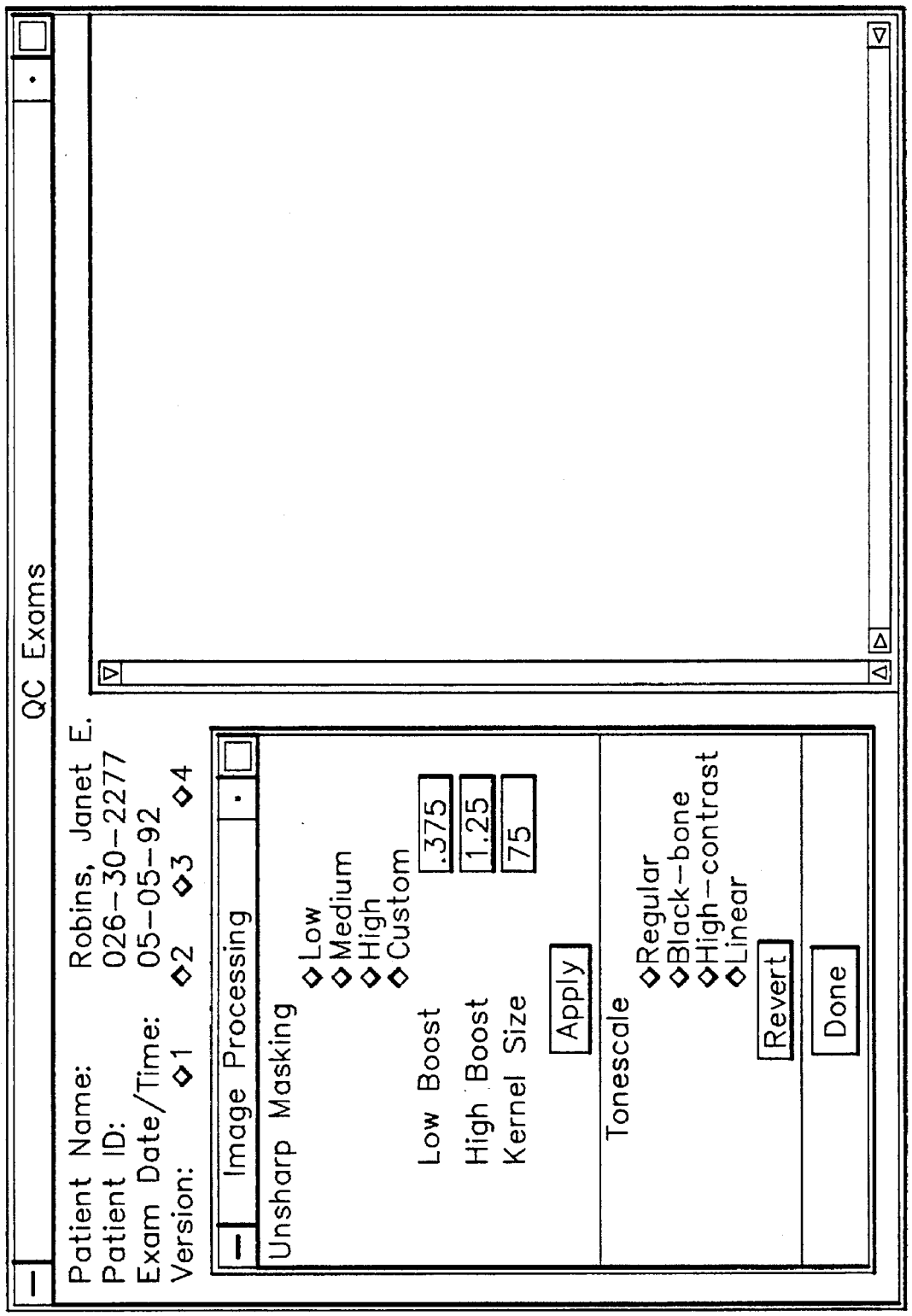
Figure 15:
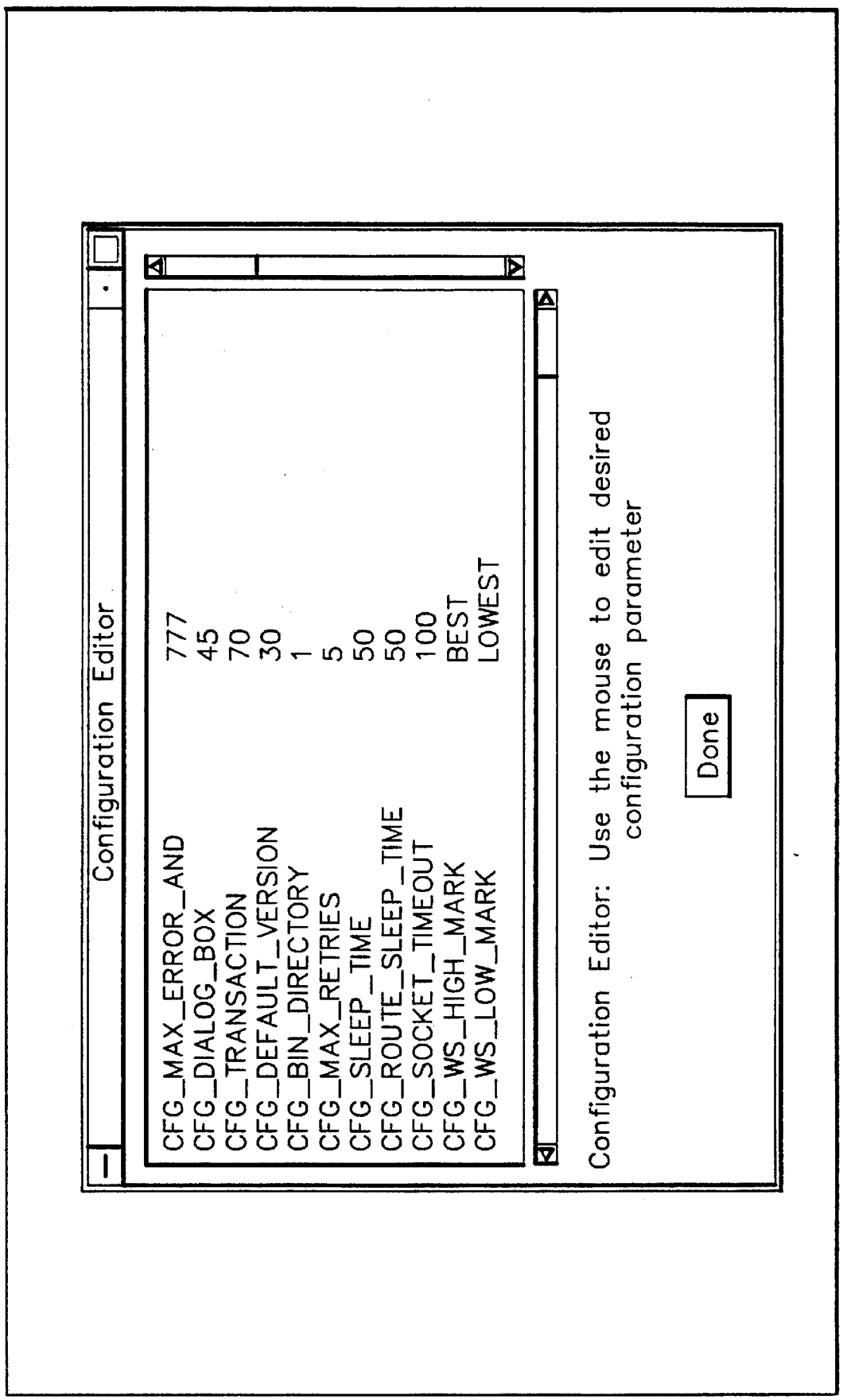
Figure 16:
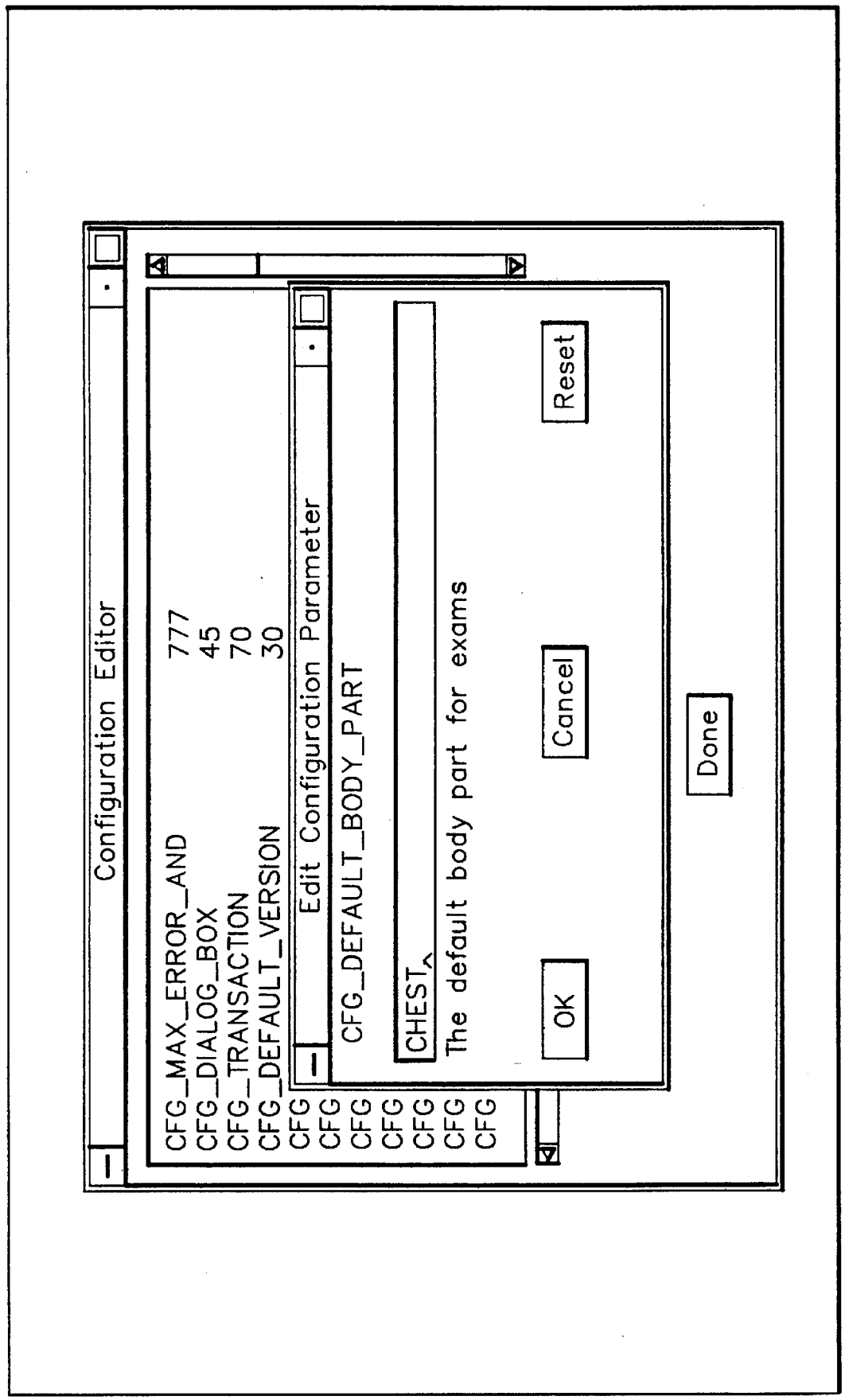

Referring to FIGS. 14, 15, and 16, they will be briefly described before more detailed explanation of the functions shown thereon. FIG. 14 shows the QC exam screen with image processing window, which allows the user to change image processing parameters for the currently displayed version. This window appears when an exam is selected for reprocessing, or when the image processing button is selected. FIG. 15 shows the configuration screen where a user selects a configuration parameter to change. FIG. 16 shows a configuration edit screen where a user enters the value for the configuration parameter using this screen.

Figure 17:
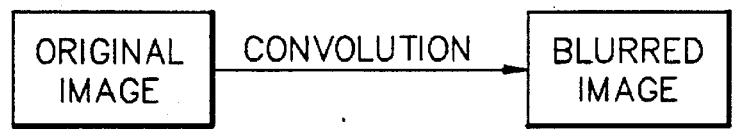
FIGS. 17–20 are diagrammatic views useful in illustrating unsharp masking image processing.
Figure 18:

Referring again to FIG. 14, the image processing functions will be described in greater detail. As shown in the image processing window on the left, image processing parameters include unsharp masking parameters and tonescale parameters. In general, unsharp masking, or edge enhancement, is applied to an image to produce an image with lines or edges that are more clearly defined. This is done by first "blurring" a copy of the image through convolution. Convolution is a mathematical process which multiplies the image by a kernel. The size of the kernel determines the number of weight factors and, therefore, the extent to which the image is blurred. This is depicted in FIG. 17. The blurred image is then subtracted from the original image to create an "edges only" image. This is depicted in FIG. 18. High and low boost factors are applied selectively to the "edges only" image and added back into the original image which produces the unsharp mask image.

Figure 19:
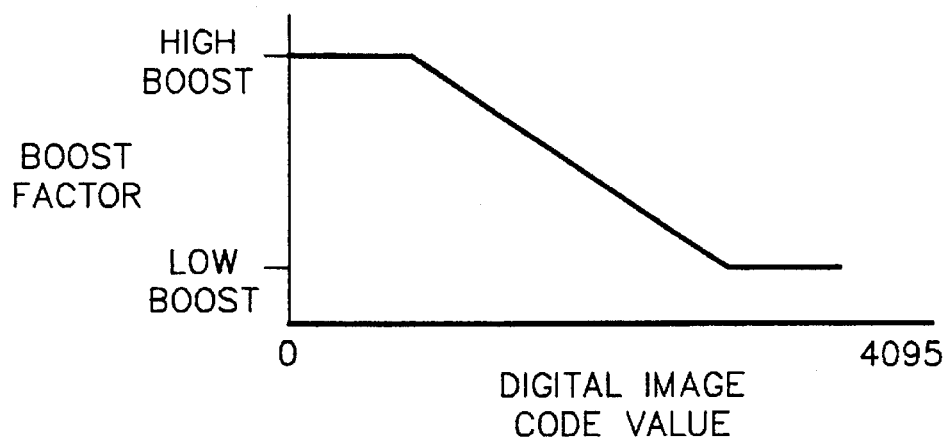

A histogram of the image is first derived as depicted in FIG. 19, which is a graphical representation of boost versus digital image value. The high boost is applied on the low intensity part of the image (left part of histogram) and the low boost on the high intensity part. There is a linear transition between the high and low boost values which is determined by the "threshold value and width" parameters that are created by an auto tonescaling algorithm.

Figure 20:
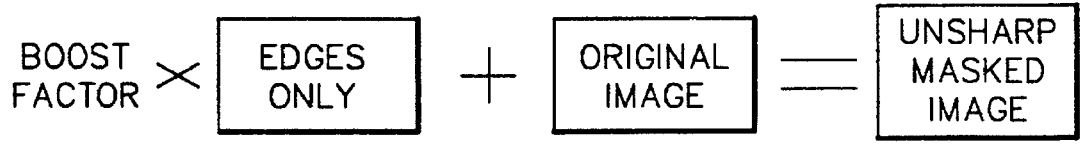

The unsharp masking algorithm preferably used by the image processing software of workstation 202 is as follows: P prime (new pixel)=P (current pixel)+B (boost factor)×(P–$\overline{P}$ (kernel average)). Changing low or high boost factors impacts the presentation of the edges in the low and high intensity part of the image. This is depicted in FIG. 20.

The preferences for unsharp masking (kernel size and boost factors) can be specified according to body part. If the body part or the values are changed specifically, then the unsharp masking process must be performed again (kernel size is the region of pixels surrounding the pixel being processed. For example, a kernel size of 75 would encompass a matrix of 75×75 pixels with the processed pixel being at the center of the matrix).

Referring again to FIG. 14, in the image processing window a user can select low, medium, high or custom unsharp masking, low boost, high boost, and kernel size. As shown, for custom unsharp masking the low boost factor is selected as 0.375, the high boost factor is selected as 1.25, and the kernel size is selected as 75 (75×75 matrix).

The tonescale selections available to a user are indicated under the tonescale heading as regular, black-bone, high contrast, or linear. These tonescale look-up tables are applicable to the version selected to be displayed on the display area of the screen of FIG. 14. When raw image data is received by quality control workstation 202 from storage phosphor reader 10, a tonescale transformation look-up table is generated according to the computed radiography image processing algorithms disclosed in the above referenced U.S. patent application Ser. Nos. 797,615 and 906,191. The transform look-up table (LUT) provides the optimal mapping of the raw image data to film using exam type, histogram, etc., information. The transform LUT can be modified at workstation 202 by the user, if the original LUT failed to produce an optimal image look. A typical graphical representation of a tonescale transform as derived above is shown in FIG. 19.

The tonescale buttons shown in the image processing window of FIG. 14 allow the user to perform the following tonescaling operations on the transform LUT:

1. Replace the transform LUT by a linear LUT as shown in FIG. 22.
2. Replace the transform LUT by a high contrast LUT, as shown in FIG. 23.
3. Replace the transform LUT by a blackbone LUT as shown in FIG. 24.
4. Change window width or/and window level. Window width and level changes are actually multiplications and additions to the transform LUT. These changes (also called deltas) are stored in the image (version) header so that the user can determine what changes have been made to the original LUT based on these values and parameters. FIGS. 25 and 26 illustrate the effect of changing window width and window level on a transform LUT. FIG. 14 is provided with vertical and horizontal scroll bars which allow changing of window width by moving up and down the vertical scroll bar and allow changing window level by moving left and right on the horizontal scroll bar.
5. Revert to the original LUT based on exam type by selecting the revert button.
6. Change the exam type so that the LUT for that exam type is applied.

Any change to a look-up table is applied only to the currently selected version.

The image processing parameter defaults are set for each exam type and maximum number of versions. FIG. 27 shows illustrative unsharp masking default values, and FIG. 28 shows illustrative tonescale default values.

Tonescaling Concepts

In order to guarantee image integrity over system 202, one or more look-up-tables (LUTs) are transmitted with the x-ray image signal produced by reader 10. (Image integrity means that an image displayed at one component is represented identically at any other component in the system, i.e., on each monitor as well as hard copy.) The LUTs accompany each image (preferably in the ACR-NEMA header) and are interpreted at each destination (i.e., QCW 202, workstation 214, laser printer 216).

The LUTs are:

Standardization LUT. This table describes how the digital pixel values should be interpreted (i.e., what physical values do they represent). This is supplied by the image acquisition device (Storage Phosphor Reader 10).

Source Display LUT. This table maintains the information of how the data was originally viewed at the image acquisition device (laser printer).

Transform LUT. This table maps the region of interest into the full dynamic range of data out.

The LUTs described above are implemented as follows at the QCW 202:

Standardization LUT. This table may not be used because the values have no reference standard for storage phosphor reader 10. In the future, this table may be utilized to create a standard for networked storage phosphor. FIG. 29 is a graphical depiction of a unity standardization LUT where digital value out=digital value in.

Source Display LUT (SDL). The Source Display LUT represents the characteristic response curve for the source display device. Each networked output (hard copy or soft copy) is responsible for maintaining an understanding of its performance (i.e., its own Display LUT). The Source Display LUT for each display device resides at the device. The image carries this LUT with it for image processing at any given display device. The SDL for QCW 202 is graphically depicted in FIG. 30.

The source display device for the storage phosphor reader 10 is assumed to be the laser printer 216. The laser printer 216 has a linear code value-to-density response curve.

As shown in FIG. 31, the Local Density-to-Display LUT for the QCW 202 (which resides at the QCW 202) must be differenced with the Source Display LUT which accompanies the scanned image from the storage phosphor reader 10 (linear LUT). The resulting LUT is then converted from density space to luminance space and then from 12-bit precision to 8-bit precision. The result is the Gamma Correction LUT which must be applied to the image before it is displayed to obtain the proper look for the QCW monitor 204.

Transform LUT. As described above, the Transform LUT is generated by the storage phosphor image processing techniques and provides the optimal mapping of the raw-image-data-to-film using the Exam Type, histogram, etc. The Transform LUT (FIG. 21) (as specified by the Exam Type) can be modified at the QCW 202 by the user if the original LUT failed to produce an optimal image look. As also described above, the user can perform the following tonescaling operations on the Transform LUT: change window width, change window level, replace by regular LUT, replace by linear LUT, replace by high contrast LUT, replace by blackbone LUT, revert to original LUT (based on Exam Type), change Exam Type (LUT for that Exam Type is applied).

Figure 32:
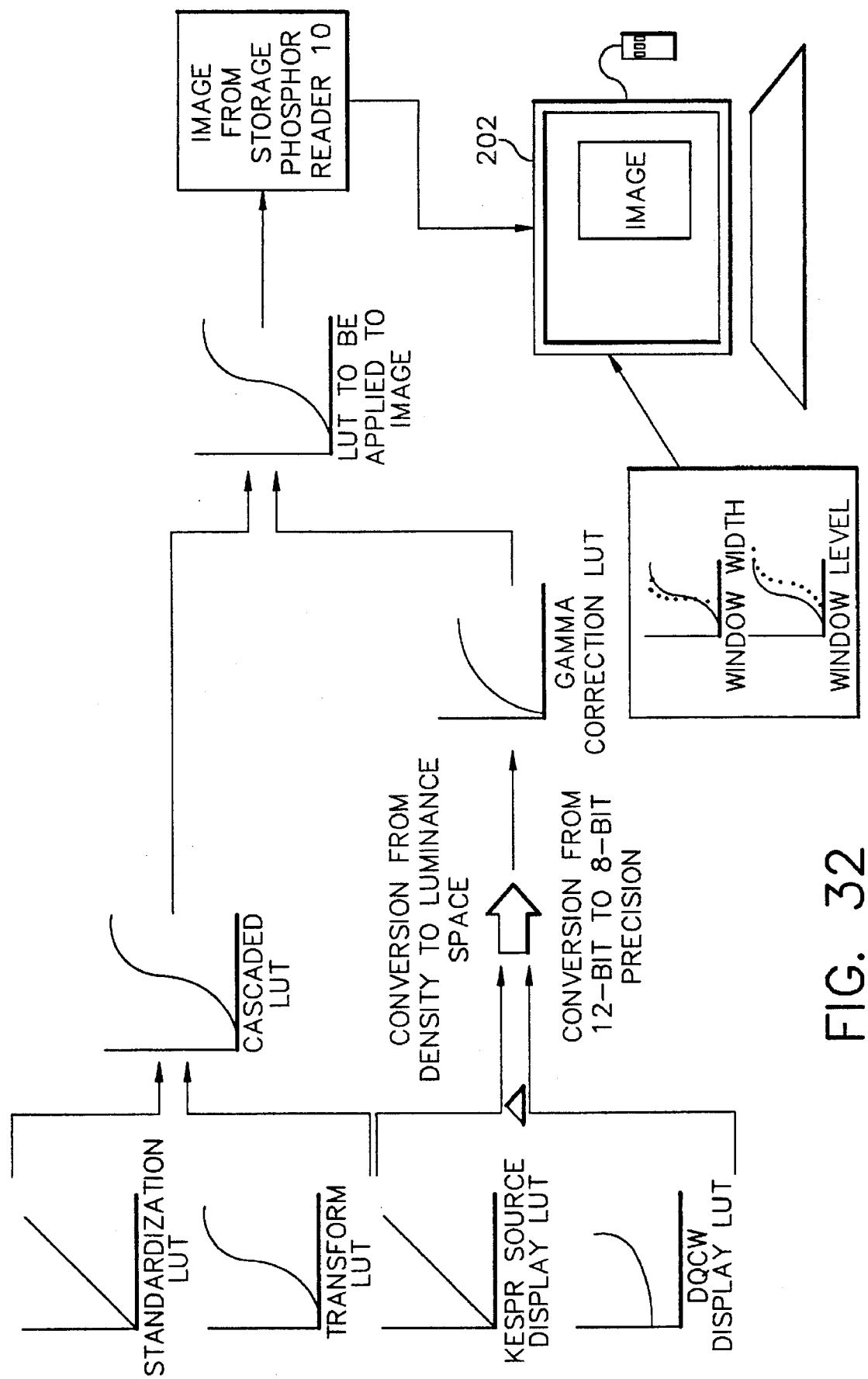

Tonescale Processing Concepts. As shown in FIG. 32, an image produced by storage phosphor reader 10 is processed in the following manner.

The Standardization LUT (if applicable) is cascaded with the Transform LUT.

The Gamma Correction LUT is determined by finding the difference between the reader 10 Source Display LUT and the QCw's 202 Display LUT, then converting it from density to luminance space, and from, e.g., 12-bit to 8-bit precision.

The cascaded Standardization/Transform LUT is cascaded with the Gamma Correction LUT. The result is applied to the image, and then displayed on QCW screen 204.

Intercept/slope and window width/level tonescale parameters can be supported as well as the Transform LUT in order to accommodate sources other than storage phosphor reader 10.

According to the present invention, a digital radiographic image is transmitted over a network to softcopy or hardcopy visualization devices such that tonal consistency across the network is maintained. As discussed above, the soft copy images tonal response is different from the assumed linear image output density devices (hardcopy) response in the following ways: 1) nonlinear; 2) Smaller Dynamic Range; 3) Less resolution; 4) Inverted; and 5) Viewing conditions.

An accurate tonal matching scheme has been developed to create a look-up-table that accounts for the nonlinearity, dynamic range, inversion and the viewing conditions. This was done by modeling both systems and incorporating some work done with the human visual system to create the same level of "visibility" of the data. This LUT is generated by measuring the tonal response of the CRT system with a photometer. In addition to the CRT's performance at a given gain and offset, the ambient conditions are monitored and folded into the equation. The tonal match does limit the output on film compared to film's potential range. If desired, no matching can be implemented resulting in images optimized for each output's display performance.

The following concepts, definitions and assumptions are useful in describing the present invention.

1. Code Values. Low code values=Low Luminance=High Density=Dark regions.

High code values=High Luminance=Low density=Bright regions.

2. NORMAL/REVERSE Flag. The Normal (NOR) setting for this flag implies the above definition for code values. The reverse (REV) setting implies an inversion of all the index values for the Source to Density LUT that accompanies the image data.

$$LUT_{SDLimageREVERSE}[CV_x] = LUT_{SDLimageNORMAL}[CV_{MAXIMUM} - CV_x]$$

Alternate parameters: None.

If no Nor/Rev specified, NORMAL is assumed.

Note: switching the NOR/REV flag has no impact on the interactive WW/WL values.

3. Standard Value Table. This table defines the digital values into standardized units (or meaningful terms) where there are established standards. This table is an adjunct table, not used in the tonescaling of the image. It would allow a user to convert the raw data units with meaning. (Converts from binary counts to standardized values.)

Alternate parameters: None.

If no Raw to Standard Value Table assume unity, CVin= CVout.

4. Tonescale Table. This table describes the code values of interest and how they are distributed over the entire outputs dynamic range. The window width and level values can be utilized to construct a tonescale table or operate on the included tonescale table. The impact of utilizing the alternate parameters is a linear tonescale correction within the window of interest and values. The constructed LUT, clips above the maximum and below the minimum values described by the WW/WL parameters. The presence of both window width and window level dictates that both tonescale adjustments be utilized to construct a modified tonescale LUT. The correct sequencing is to create a $LUT_{WW/WL}$ and cascade the two tables together in the following manner; $LUT_{tonescale^*}(X)=LUT_{WW/WL}[LUT_{tonescaleORG}(X)]$. The sequencing selects region of the original $LUT_{tonescale}$ by the specified window and level values and expands or compresses the data. The LUT converts from standardized data into selected display code values. These display code values are in terms of the SDL that is also sent with the image.

Alternate or additional parameters: Window width and Window Level.

If no tonescale Table or WW/WL values, assume WW=4096 and WL=2048.

5. Source to Density LUT (SDL). This table defines the distribution of the tonal response for the source imaging device. The output of this table is defined in normalized density units. It encodes the display performance (and environment) to allow other network output/display devices to accurately reproduce the image in a consistent manner. The structure of the table assumes that the data in, is in units of the input device. An example for the digitizer, would have density in and density out as the digitizer assumes a density display device. Therefore, the output is defined consistently with the "Reverse" definition for the NOR flag. The output code value assumes a linear code value to density response, as is typical for a hardcopy printing systems. This linear response is defined as reverse of the CRT systems, per the NOR/REV flag. The low output values represent low density and high values result in high density. The curve shape values represent a simplified SDL and can be computed algorithmically. The curve shape index varies from 0–6. A 0, zero, index represents a unity LUT. As the curve shape index increases, the extent of non-linearity also increases. The softcopy display devices can ignore all curve shape values except zero. The presence of a zero means that the input wants no correction, assuming a linear density output. Therefore, the softcopy display devices must translate the data for its systems non-linearities.

Alternate parameters: Nonlinear Curve Shape values.

If no SDL assume linear (CVout=CVin), CS=0.

6. Local Density to Display LUT (LDDL).

This table remains local to a given display device. Its function is to correct the data from density to its own display response units. This file remain local to the display device at all times. The inverse for this display correction table is the SDL. A softcopy display device may provide a new SDL if none was present in the original image and rewindowing and leveling are done. So if a non-linear curve shape is received with the image data and the image is rewindowed and leveled, softcopy workstation 214 will erase the curve shape value and insert a SDL of the workstation 214. If a curve shape of zero is received, it is left alone.

Alternate parameters: None.

Figure 38:
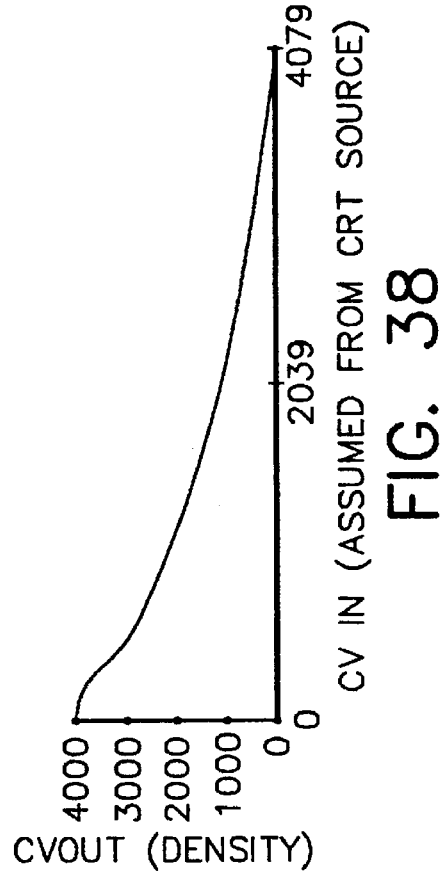
Figure 37:
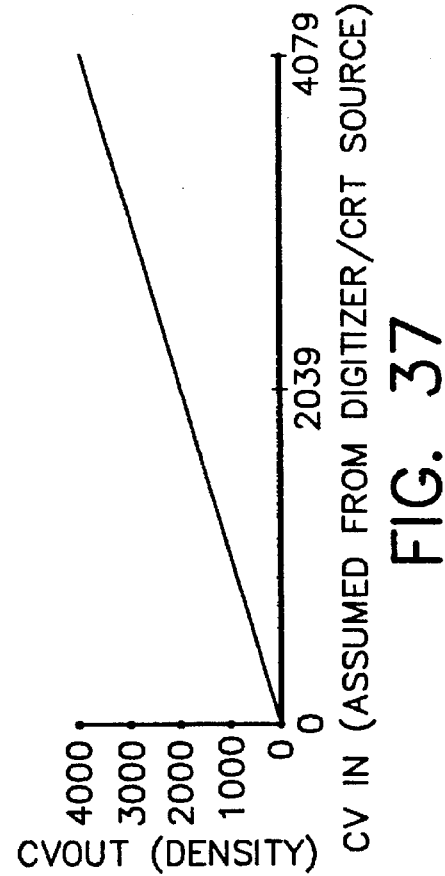
Figure 39:
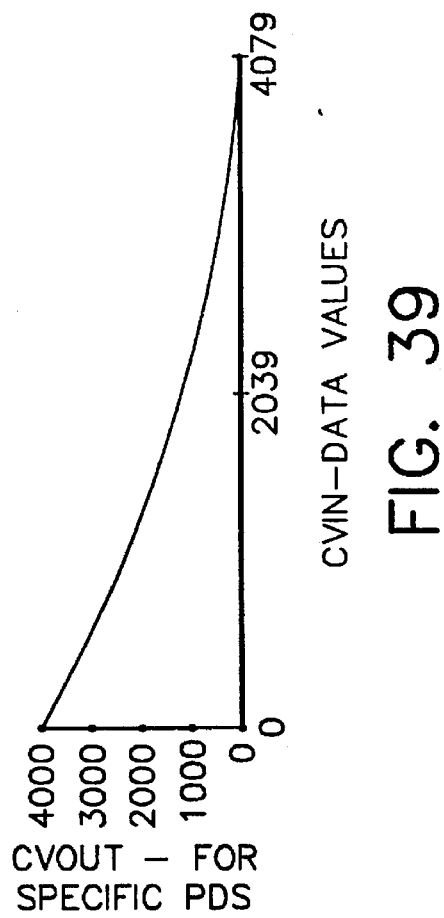

7. Local Display Correction Table. This table is computed by differencing the LDDL and the SDL tables as shown in FIGS. 37–39. This table is never passed with any image data and there will be a 12 bit table used as a default for softcopy displays.

8. Maximum Density. (Dmax). Used to specify the maximum density to print to. It can also be used to define dynamic range considerations. This parameter is not currently being utilized for softcopy display applications, but is used for hardcopy output.

Default—Highest output to maximize the dynamic range.

9. Minimum Density, (Dmin). Used to specify the minimum density to print an image to. It can also be used to define dynamic range considerations. This parameter is not currently being utilized for softcopy display applications, but is used for hardcopy output.

Default—minimized to utilize full dynamic range.

10. Contrast Adjustment. This parameter is set based on customer preference. It allows the customer to modify the contrast of the image, for example, by pivoting around a 1.20 optical density for hardcopy output. This parameter is ignored for softcopy display.

Default=no contrast adjustment.

Implementation of the Tonescale

Each peripheral will have a processing scheme unique to its own constraints, but here is an overview of how the data should be handled in a general sense. The details are broken into the following categories: Inputs include softcopy devices, such as workstation 214, QCW 202 or a physicians workstation; Modalities, such as ultrasound (US), computed tomography (CT), magnetic resonance imaging (MR), digital subtraction angiography (DSA), nuclear medicine (NM); and direct inputs, such as storage phosphor reader 10 or radiographic film digitizers. Network links include archive devices, communication link, or gateway device. Outputs include laser printers, cathode ray tube printers, thermal printers.

The impact of the differences between these categories will be minimized as the consistency of the data provided and the consistency of how it is handled improves.

The categories on the input side are Softcopy, standard modalities and Direct inputs. The definition for the direct inputs is that the data has never been previously visualized. The digitizer and storage phosphor systems do not present the data visually until it reaches an output. The modalities have some method of reviewing the image data visually and therefore if matching is desired, the specific system must be characterized. The appropriate image process parameters are specified during a set-up procedure for the gateway device that makes them network compatible. The same is true for any input softcopy. The system must be characterized for correct tonal matching.

The outputs are broken into hard or soft copy. The exact tonal correction scheme is detailed below for each category. The image processing scheme will be handled by the interface device to all of the hardcopy devices.

Inputs

Direct Inputs. Must provide all input parameters or utilize the default value for correct visualization of the data. The issues here are that both devices assume a unity correction table for the Source to Density LUT, curve shape 0. This results from both the digitizer and storage phosphor systems adjusting their tonescale (tonescale) for linear density hardcopy output. There is no inversion of the data for hard copy display, but softcopy must do a high to low swap. This inversion is performed in during the computation of a correction table based on the SDLs that are compared. The storage phosphor system utilizes a non-linear mapping scheme for its tonescale table. The digitizer needs to provide its tonescale table to correct for high end (High Density) shouldering and Dmin correction. In both cases, the units assume the default for the Standard Value table of unity.

TABLE 1

| Parameters to Supply | Digitizer | KESPR |
|---|---|---|
| Reference for Code Values | Lo CV = Low Den | Lo CV = Low Den |
| NORMAL/REVERSE flag - | Customer Preference | Customer Pref. |
| Source to Density LUT (SDL) - | Unity (Use Default) | Unity (Use Default) |
| Tonescale Table - | needs WW/WL or nonlinear Unity | Image Specific Unity |
| Maximum Density, (Dmax) - | None Specified | None Specified |
| Minimum Density, (Dmin) - | None Specified | None Specified |

Standard Modalities. Must be set up with either determined SDL or a default curve shape parameter. The computation of the SDL will be specified in a separate section. The standard modalities have the ability to visually display the data. The technician or doctor makes decisions based on the image viewed and would like an accurate reproduction of the image for evaluation at a separate output device, hard or soft copy.

TABLE 2

| Parameters to Supply | US/CT/MR . . . |
|---|---|
| Reference for Code Values | Lo CV = Low Lum |
| NORMAL/REVERSE flag - | Customer Preference |
| Source to Density LUT (SDL) - | Measured during set-up (or CS default) |
| Tonescale Table - Standard Value Table - | WW/WL or nonlinear TBD |
| Maximum Density, (Dmax) - | Customer Preference, Specified at set-up |
| Minimum Density, (Dmin) - | Customer Preference, Specified at set-up |

Networking Functions

The communication, archival and protocol conversion should have no impact on image processing other than the protocol needs to be in place to ensure the allocation and maintenance of these values over time. ACR-NEMA ver 3.0, lists this data in the following locations in the developing standard.

TABLE 3

| Parameters to Supply | ACR-NEMA Element |
|---|---|
| Reference for Code Values NORMAL/REVERSE flag - | (Group, Element) (0000, 5140) |
| Source to Density LUT (SDL) - Descriptors | (50xx, 1310) Proposed Ver 3.0 |
| Source to Density LUT (SDL) - Explanation | (50xx, 1311) Proposed Ver 3.0 |
| Source to Density LUT (SDL) - LUT Data | (50xx, 1312) Proposed Ver 3.0 |
| Curve Shape - | (0029, 0055 ) Shadow, (0028, 1060 Proposed Ver 3.0 |
| tonescale Table - Descriptors | (50xx, 1210) Proposed Ver 3.0 |

TABLE 3-continued

| Parameters to Supply | ACR-NEMA Element |
|---|---|
| tonescale Table - Explanation | (50xx, 1211) Proposed Ver 3.0 |
| tonescale Table -LUT Data | (50xx, 1212) Proposed Ver 3.0 |
| Window Width | (0028, 1051) |
| Window Level | (0028, 1050) |
| Standard Value Table - Descriptors | (50xx, 1110) Proposed Ver 3.0 |
| Standard Value Table - Explanation | (50xx, 1111) Proposed Ver 3.0 |
| Standard Value Table - LUT Data | (50xx, 1112) Proposed Ver 3.0 |
| Maximum Density, (Dmax, Image) - | (0001, 5143) |
| Minimum Density, (Dmin) - | (0001, 5142) |
| Contrast Adjustment | (0001, 5141) |

Outputs

Softcopy. The correct methodology for processing tonescaling information is illustrated in FIGS. 33, 34, 37–39. CRT typically have a limited dynamic range compared to hardcopy outputs. As a result, the Contrast, Dmax and Dmin adjustments should not be applied. The presence of any curve shape parameter, except 0 (zero), would mean apply no Local Display Correction Table correction. The curve shape values represent an approximation of correcting the data from softcopy viewing to matched display from a hardcopy device. In the instance where an image file is sent to a CRT display, the non-linearities would be similar and therefore no correction is applied for nonlinear curve shapes. A linear curve shape of 0 (zero), means that the hardcopy output needs to do no correction, but the softcopy does. The input assumed a linear code value to density output device. The details of the correction is illustrated in FIGS. 37–39.

Figure 33A:
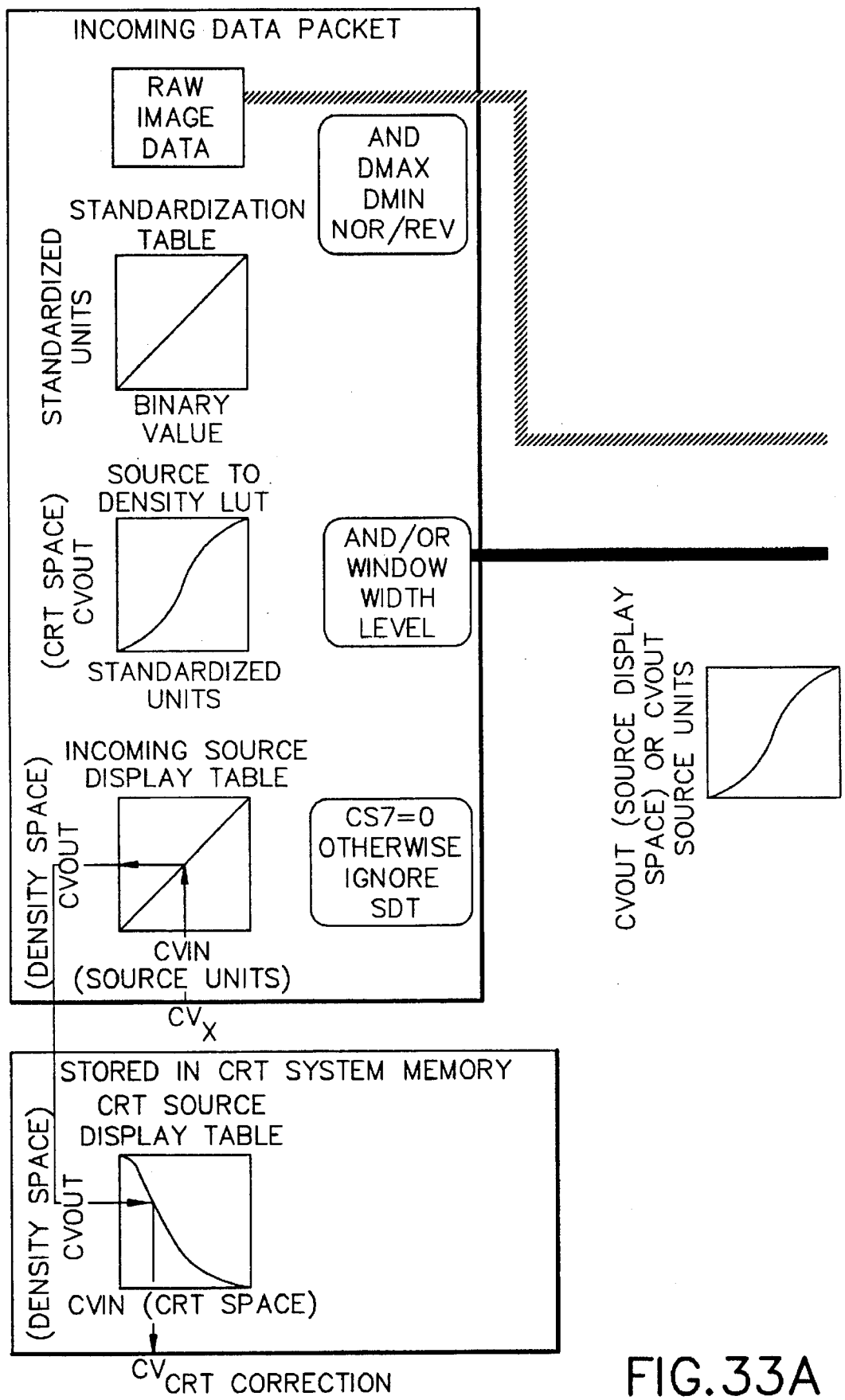
Figure 33B:
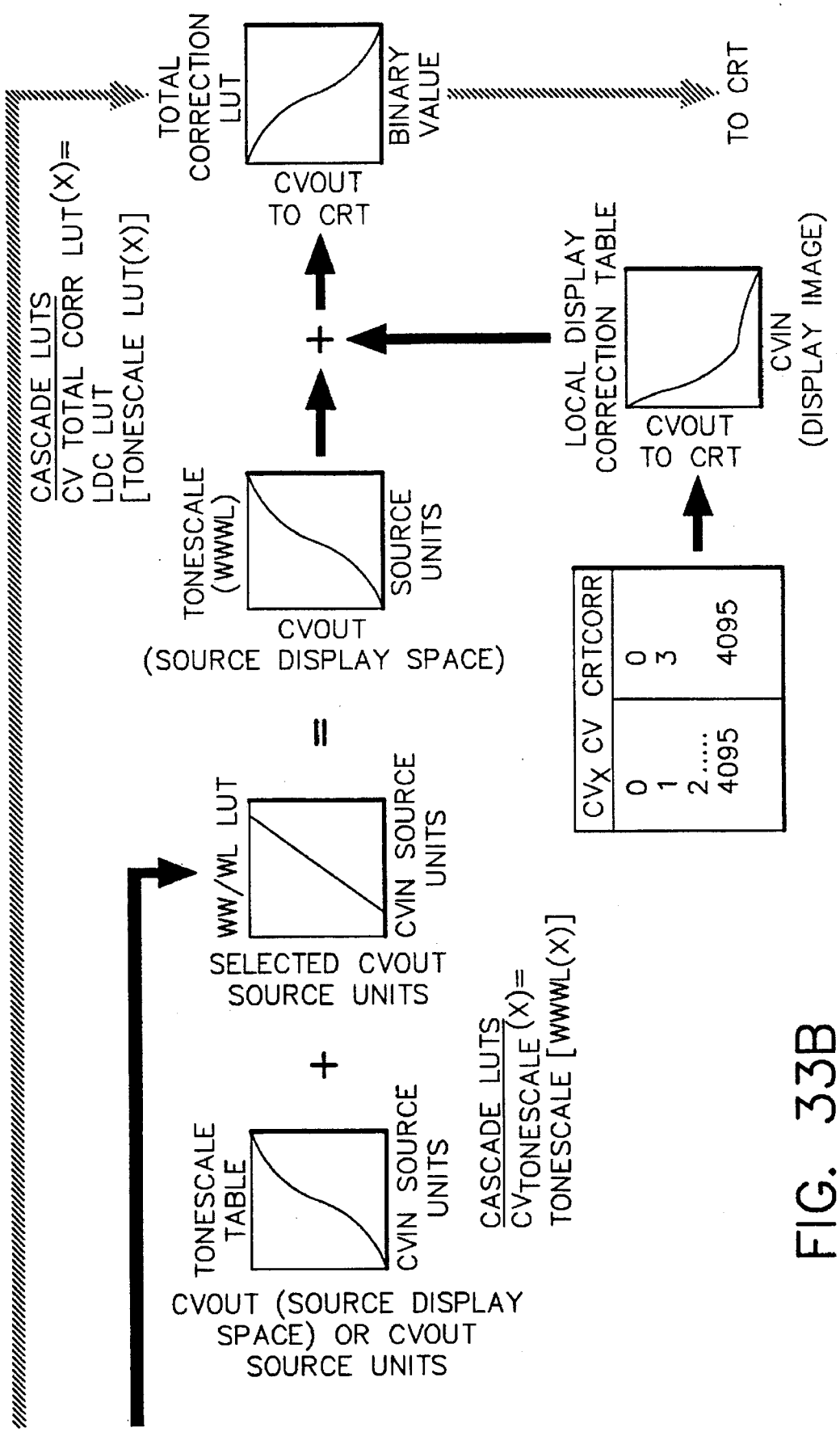
Figure 34A:
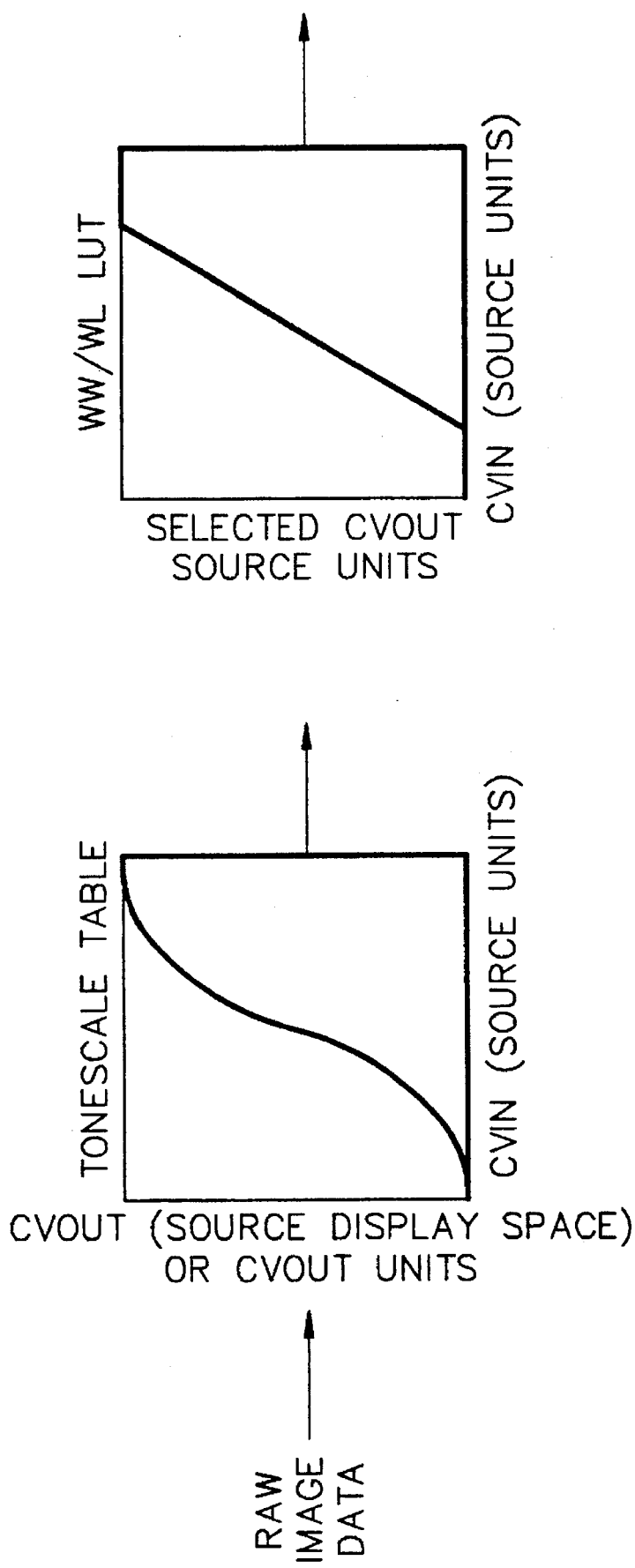
Figure 34B:
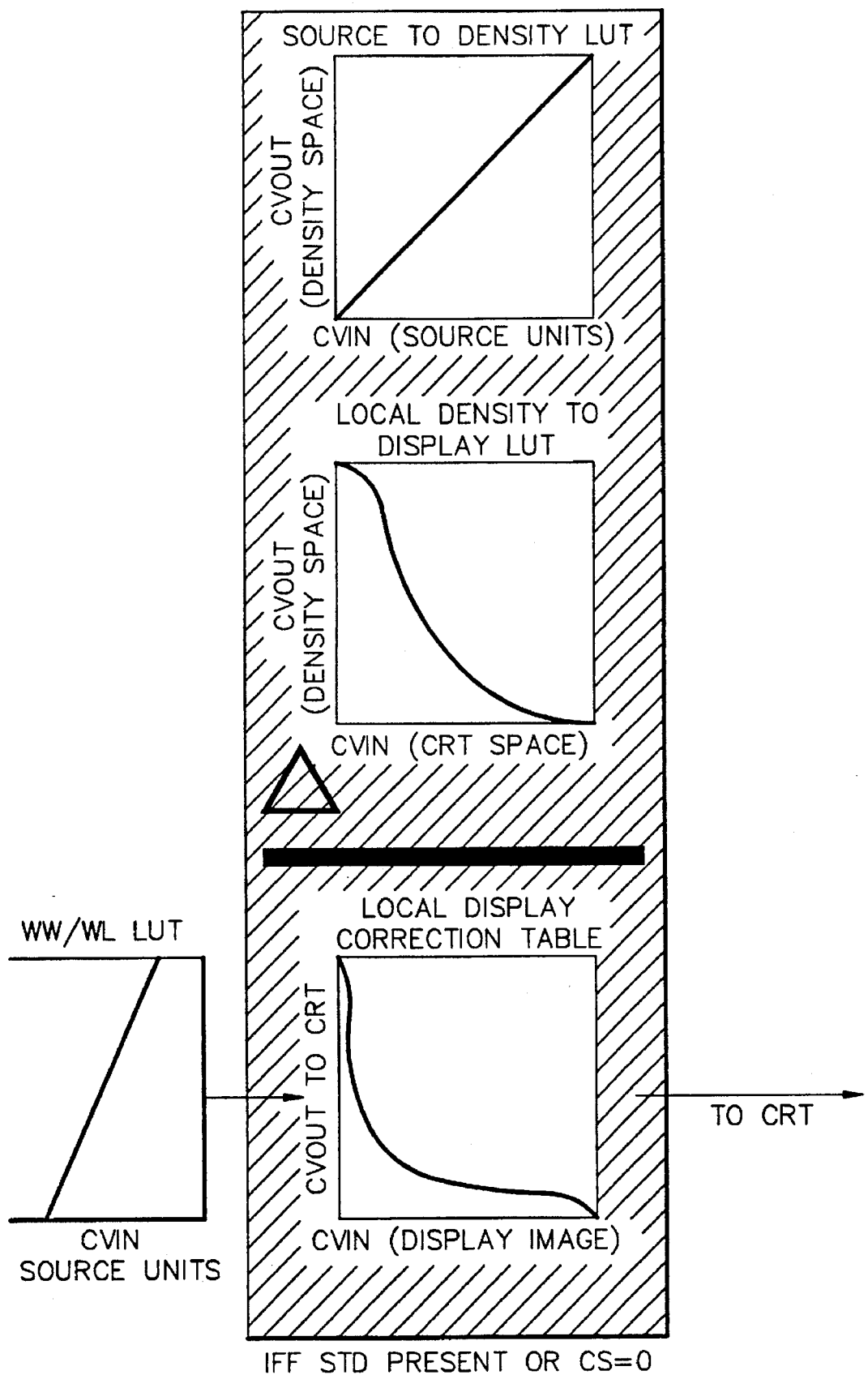

If the image is re-windowed and leveled (or any other nonlinear tonescale adjustment), the workstation 214 must supply the SDL (or recommended curve shape) for the CRT where the re-window/leveling was done. The effects of rewindowing and leveling on images that also contain a tonescale table, merely attaches a new set of window and level values. This allows for the original tonescale table to be maintained, for potential future rewindowing and leveling. The details of how to build a correction table is illustrated in FIGS. 33 and 34. The CRT (workstation 214 or QCW 202) should be set up for optimal performance based on the environmental limitations. The tonal response is then characterized and a SDL is computed. This characterization is based on the tonal response, the ambient conditions and the human visual system. The computed SDL must then be stored in the nonvolatile system memory. This table is utilized to provide tonal matching for images from sources that have also been characterized.

TABLE 4

| Parameters to Interpret | CRT Display: PDS/DQCW |
|---|---|
| Reference for Code Values | Lo CV = Low Lum |
| NORMAL/REVERSE flag - | Customer Preference |
| Local Density to Display LUT - | Measured during set-up (or 12-bit default) |
| SDL | CS-0, process (Ignore nonlinear curve shapes) |
| tonescale Table (or WW/WL) - | downloaded per-image |
| Standard Value Table - | Ignored |
| Maximum Density, (Dmax) - | Not applied |
| Minimum Density, (Dmin) - | Not applied |
| Contrast Adjustment | Not applied |

Figure 35:
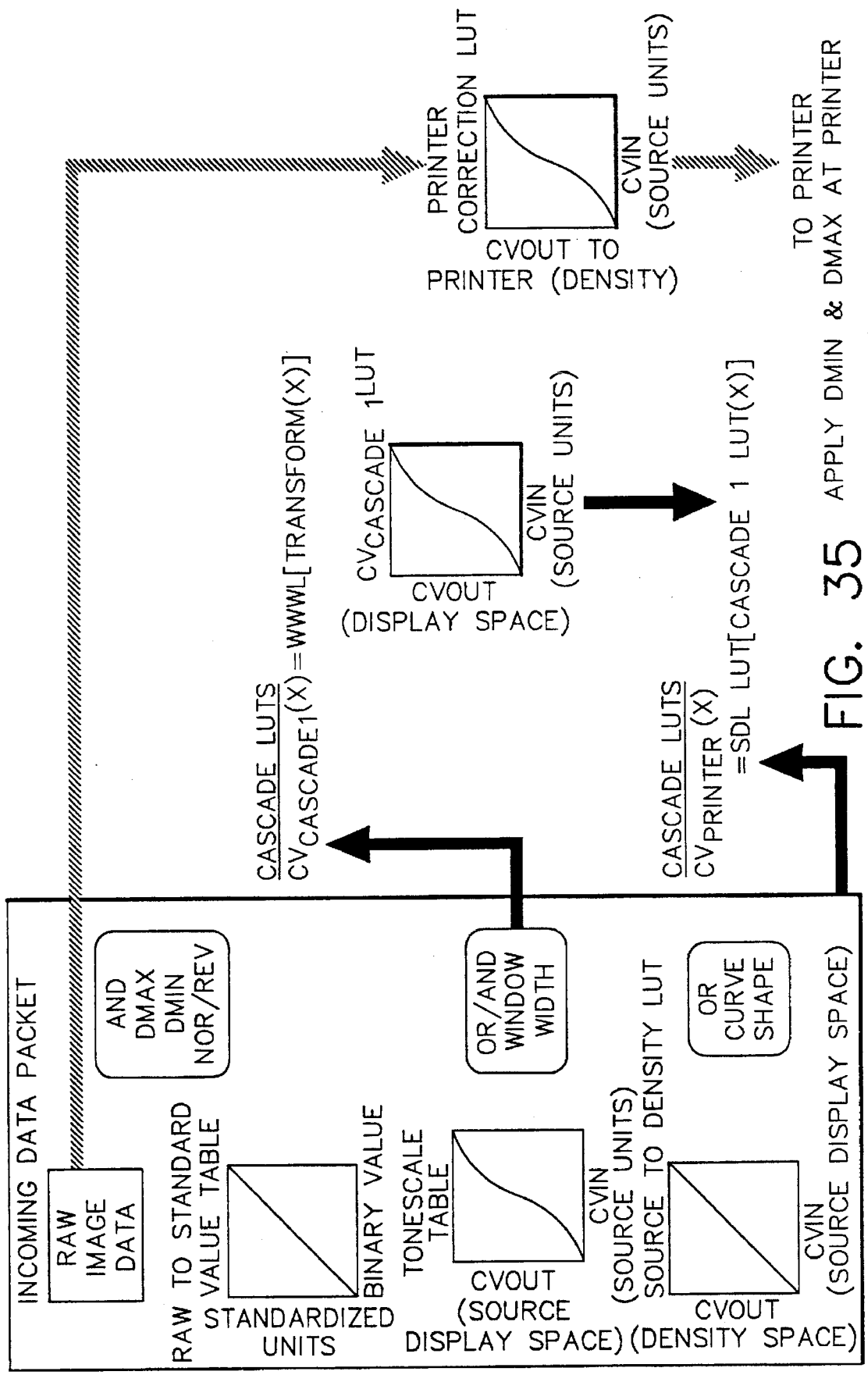
Figure 36:
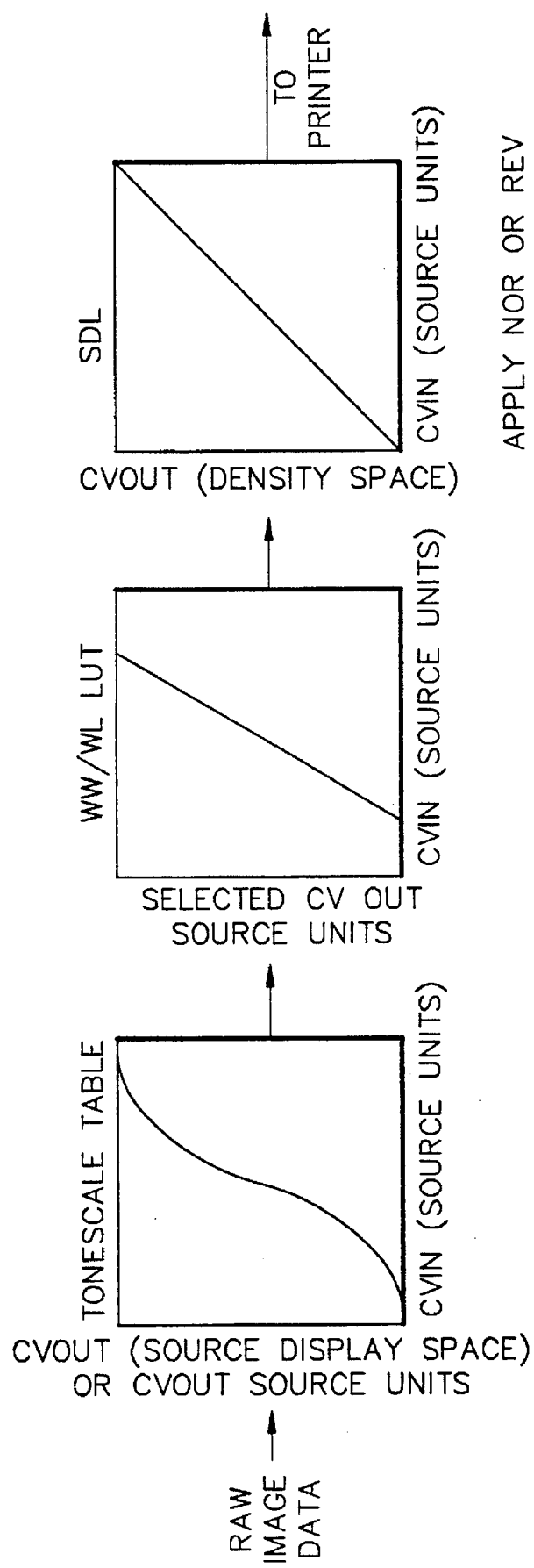

Hardcopy. The hardcopy laser printers must support one downloadable look-up-table per image to correctly apply the tonescaling adjustment. The Network interface must correctly combine the provided tonescaling data and provide one table that the data is passed to the printer. The downloaded LUT is the combination of all three tables and NOR/REV. FIGS. 34 and 35 illustrate the details on how to correctly sequence the cascading of the tables. The parameters of Dmax, Dmin and contrast must be supported by the printers for full compatibility.

TABLE 5

| Parameters to Interpret | Hardcopy |
| --- | --- |
| Reference for Code Values | Lo CV = Low density |
| NORMAL/REVERSE flag - | Customer Preference |
| Source to Density LUT (SDL) - | Combined with TL |
| tonescale Table (and/or WW/WL) - | and SDL to create 1 download able LUT |
| Standard Value Table - | ignored |
| Maximum Density, (Dmax) - | Sent to printer |
| Minimum Density, (Dmin) - | Sent to printer |
| Contrast Adjustment | Sent to printer |

Referring now to FIGS. 37–39, there will be described the process of how the SDL is utilized in the image processing internal to a softcopy display. The SDL shown in FIG. 37 is a graphic depiction of an exemplary SDL from storage phosphor reader 10 or from a film digitizer. Both of these devices assume a linear digital image code value (CV) to density device. The graph is unity as the SDL implies the conversion of the image units to density out. The code values to display the data in the same manner are not inverted as the digitizer/storage phosphor reader data assumes linear hardcopy output.

FIG. 38 shows an exemplary LDDL developed for a representative personal display station (PDS) workstation supplied by Vortech, of Richardson Tex. The LUT is nonlinear and the eyes sensitivity function has been included to give the same visibility of the data on film as it has on the workstation display.

The final step is to cascade the SDL and LDDL by looking up the normalized density values from the incoming SDL in the LDDL table where the image is to be displayed. The lookup procedure uses for $CV_{IN}$, the $CV_{ouT}$ of the incoming table, looked up in the LDDL table as what $CV_{IN}$ gives that value out. This generates the LUT of FIG. 39 which is utilized to correct the images for viewing on the PDS workstation $$PDS_{COR.LUT}(CV_x) = LDDL_{PDS}^{-1} [SDL_{ORG}(CV_x)]$$

Advantages and Industrial Application

The present invention finds application in medical diagnostic imaging systems. Image integrity and image tonal consistency is guaranteed for digital radiographic images transmitted over a network between input and output devices. Tonal responses between softcopy and hardcopy output image devices are compensated. These tonal response differences compensated for include linear/nonlinear, dynamic range, resolution, inversion, viewing conditions.

Although the invention has been described with reference to preferred embodiments thereof, it will be understood that variations and modifications can be effected within the spirit and scope of the invention, as described above and as defined in the appended claims.

What is claimed is:

1. A method of transmitting an input digital radiographic image signal over a network to insure consistent tonal matching, comprising the steps of:

producing an input digital radiographic image by a source imaging device having a source display device;

providing a source-to-density look-up-table SDL which represents the characteristic response curve for the source display device and which is determined independently of said produced digital radiographic image;

transmitting the input digital radiographic image signal over a network to an output radiographic image visualization device along with said SDL; and including the step of providing a normal/reverse flag for the SDL where depending upon the type of source imaging device, the normal/reverse setting implies either a) the "normal" setting implies that low digital image values=low luminance=high density=dark regions and high digital image values=high luminance= low density=light regions and the "reverse" setting implies an inversion of all the index values for the SDL; and b) the "normal" setting implies low digital image values=high luminance=low density=light regions and high digital image values=low luminance=high density=dark regions and the "reverse" setting implies an inversion of all of the index values for the SDL.

2. A method of transmitting an input digital radiographic image signal over a network to insure consistent tonal matching, comprising the steps of:

producing an input digital radiographic image by a source imaging device having a source display device;

providing a source-to-density look-up-table SDL which represents the characteristic response curve for the source display device and which is determined independently of said produced digital radiographic image;

transmitting the input digital radiographic image signal over a network to an output radiographic image visualization device along with said SDL; and including the steps of providing a local density-to-display look-up-table (LDDL) at said output imaging device, cascading said SDL and said LDDL together to form an output device display correction table, and processing said transmitted digital radiographic image signal with said display correction table to produce a tonally corrected visual radiographic image.

3. The method of claim 2, including the step of creating a tonescale look-up-table (LUT) for said digital radiographic image signal, which is dependent on at least one characteristic of said digital radiographic image, and said transmitting step includes sending said tonescale LUT with said digital radiographic image signal and said SDL.

4. The method of claim 3 wherein said producing step includes converting a latent radiographic image stored in a storage phosphor into a digital radiographic image signal, and wherein said creating a tonescale LUT step includes producing a histogram of the tonal range of said digital radiographic image signal and creating said tonescale LUT as a function of said histogram.

5. The method of claim 3 including providing window width (WW) and/or window level (WL) tonescale values in addition to said tonescale LUT and said transmitting step includes transmitting said WW and WL values with said digital radiographic image signal.

6. The method of claim 2 wherein said transmitting step includes transmitting with said input digital radiographic image, maximum and minimum densities (Dmax/Dmin) which are used to specify the maximum and minimum densities to print an image to or to define dynamic range characteristics.

7. The method of claim 2 wherein said transmitting step includes transmitting with said input digital radiographic image, a contrast adjustment for hardcopy output.

8. A digital radiographic image system, comprising:

a digital radiographic image input source means for producing a digital radiographic image signal having a source-to-density look-up-table (SDL) associated therewith;

an output radiographic image visualization means for producing a visual radiographic image of said digital radiographic image signal, said output visualization means having a local density-to-display look-up=table (LDDL); and network means for linking said digital radiographic image input source means and said output radiographic image visualization means;

wherein said source means transmits a produced digital radiographic image signal with said associated SDL over said network means to said visualization means; wherein said visualization means cascades said transmitted SDL with said LDDL to produce a local display correction table; and wherein said visualization means processes said transmitted digital radiographic image signal with said local display correction table to produce said visual radiographic image.

* * * * *